United States Patent
Huxham et al.

(10) Patent No.: US 9,860,749 B2
(45) Date of Patent: Jan. 2, 2018

(54) SYSTEMS AND METHODS FOR VERIFICATION CONDUCTED AT A SECURE ELEMENT

(71) Applicant: Visa International Service Association, San Francisco, CA (US)

(72) Inventors: Horatio Nelson Huxham, Cape Town (ZA); Alan Joseph O'Regan, Cape Town (ZA); Tara Anne Moss, Cape Town (ZA); Hough Arie Van Wyk, Cape Town (ZA)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 14/894,712

(22) PCT Filed: May 29, 2014

(86) PCT No.: PCT/IB2014/061813
§ 371 (c)(1),
(2) Date: Nov. 30, 2015

(87) PCT Pub. No.: WO2014/191952
PCT Pub. Date: Dec. 4, 2014

(65) Prior Publication Data
US 2016/0135048 A1     May 12, 2016

(30) Foreign Application Priority Data
May 29, 2013  (ZA) ................................ 2013/03903

(51) Int. Cl.
*H04W 12/06*  (2009.01)
*G06Q 20/32*  (2012.01)
(Continued)

(52) U.S. Cl.
CPC ........ *H04W 12/06* (2013.01); *G06F 12/1408* (2013.01); *G06Q 20/3229* (2013.01);
(Continued)

(58) Field of Classification Search
CPC ... H04W 88/02; H04W 12/00; H04W 76/021; H04W 12/06; H04W 76/02; H04W 12/08;
(Continued)

(56) References Cited

U.S. PATENT DOCUMENTS 7,303,137 B2   12/2007   Ho
7,970,380 B2   6/2011    Laitien
(Continued)

FOREIGN PATENT DOCUMENTS

EP   2228754 A1   9/2010
EP   2271141 A2   1/2011
(Continued)

OTHER PUBLICATIONS

International Search Report dated Sep. 26, 2014 in PCT/IB2014/061813, 2 pages.
(Continued)

*Primary Examiner* — Meless Zewdu
(74) *Attorney, Agent, or Firm* — Kilpatrick Townsend & Stockton LLP

(57) ABSTRACT

Systems and methods for verification conducted at a secure element are disclosed. In a method of verification conducted at a secure element interacting with a mobile device, the secure element receives at least one of an identifier of a universal integrated circuit card (UICC) and an identifier of the mobile device. The secure element then compares each of the received at least one identifiers against a registered identifier of corresponding form stored in a non-volatile memory of the secure element. If the received at least one identifiers match corresponding registered identifiers stored
(Continued)

in the non-volatile memory, the secure element permits further interaction with the mobile device. If at least one of the received identifiers do not match corresponding registered identifiers stored in the non-volatile memory, the secure element denies further interaction with the mobile device.

17 Claims, 11 Drawing Sheets

(51) Int. Cl.
*H04L 29/06* (2006.01)
*G06F 12/14* (2006.01)
*H04W 76/02* (2009.01)
*H04W 88/02* (2009.01)

(52) U.S. Cl.
CPC ...... *H04L 63/0442* (2013.01); *H04L 63/0853* (2013.01); *H04W 76/021* (2013.01); *G06F 2212/1052* (2013.01); *H04W 88/02* (2013.01)

(58) Field of Classification Search
CPC ..... H04W 12/10; H04W 12/04; H04W 12/12; G06F 12/1408; G06F 2212/1052; G06F 12/14; G06F 2212/00; G06Q 20/3229; H04L 12/1464; H04L 63/0853; H04L 63/0442; H04L 29/06; H04L 63/085; H04L 9/006; H04L 9/00; H04L 9/0877
See application file for complete search history.

(56) References Cited

U.S. PATENT DOCUMENTS

| | | | | |
|---|---|---|---|---|
| 8,307,202 | B2* | 11/2012 | Heinonen | H04L 63/062 713/156 |
| 9,143,922 | B2* | 9/2015 | Veneroso | H04W 8/205 |
| 2005/0259673 | A1* | 11/2005 | Lu | H04W 92/08 370/419 |
| 2007/0262156 | A1 | 11/2007 | Chen et al. | |
| 2008/0010456 | A1* | 1/2008 | Seif | G06Q 20/382 713/169 |
| 2008/0076474 | A1 | 3/2008 | Ho | |
| 2008/0293377 | A1* | 11/2008 | Pauliac | H04W 8/20 455/411 |
| 2009/0209232 | A1* | 8/2009 | Cha | H04L 63/0428 455/411 |
| 2010/0025480 | A1* | 2/2010 | Nishizawa | G06K 19/077 235/492 |
| 2010/0062808 | A1* | 3/2010 | Cha | G06Q 20/3229 455/558 |
| 2010/0072284 | A1* | 3/2010 | Nishizawa | G06K 19/07 235/492 |
| 2011/0149533 | A1 | 6/2011 | Luo et al. | |
| 2011/0277041 | A1* | 11/2011 | Dong | G06K 19/07309 726/30 |
| 2012/0304312 | A1* | 11/2012 | Dong | G06F 9/4443 726/28 |
| 2013/0091093 | A1* | 4/2013 | Wang | G06F 17/30286 707/609 |
| 2013/0116009 | A1* | 5/2013 | Schwandt | G06K 19/07732 455/558 |
| 2013/0116010 | A1* | 5/2013 | Lepp | G06K 19/077 455/558 |
| 2013/0201646 | A1* | 8/2013 | Braun | H05K 5/0282 361/784 |
| 2013/0270349 | A1* | 10/2013 | Lepp | G06K 19/0719 235/492 |
| 2014/0101734 | A1* | 4/2014 | Ronda | H04L 9/3234 726/5 |
| 2014/0156872 | A1* | 6/2014 | Buer | G06F 21/76 710/8 |
| 2014/0290056 | A1* | 10/2014 | Huxham | H04L 63/10 29/832 |

FOREIGN PATENT DOCUMENTS

| | | | |
|---|---|---|---|
| KR | 1020040070554 | 8/2004 | |
| KR | 10 2007 0103785 | 10/2007 | |
| KR | 10-20070108283 B1 | 10/2008 | |
| KR | 100865382 B1 * | 10/2008 | ............... H04B 1/40 |
| KR | 1020120077110 A | 7/2012 | |
| KR | 1020130039270 A | 4/2013 | |
| WO | WO9812891 A1 | 3/1998 | |
| WO | 2006 095265 A1 | 9/2006 | |
| WO | 2009/115997 A2 | 9/2009 | |
| WO | WO2013013168 A2 | 1/2013 | |
| WO | WO2013013192 A2 | 1/2013 | |
| WO | WO2013166278 A1 | 7/2013 | |

OTHER PUBLICATIONS

Areno, Matthew, et al., "Securing Trusted Execution Environments with PUF Generated Secret Keys," Trust, Security and Privacy in Computing and Communications (Trustcom), 2012, IEEE 11$_{th}$ International Conference, Jun. 25, 2012, 5 pages.

Urien, Pascal, et al., "Towards a Secure Cloud of Secure Elements Concepts and Experiments with NFC mobiles", Collaboration Technologies and Systems (CTS), 2013, IEEE International Conference, May 20, 2013, pp. 166-173.

European Search Report dated Jun. 1, 2016 in European Patent Application No. 14804461, 10 pages.

Notice of Final Rejection, dated May 18, 2017, in Korean Patent Application No. 2015-7036799, 5 pages.

Non-Final Rejection dated May 18, 2017 in KR Application No. 10-2015-7036799, 5 pages.

* cited by examiner

INITIALIZE SIM

START-UP SIM

SYSTEMS AND METHODS FOR VERIFICATION CONDUCTED AT A SECURE ELEMENT

CROSS-REFERENCES TO RELATED APPLICATIONS

This application is a National Stage of International Application No. PCT/IB2014/061813, International Filing Date May 29, 2014, and which claims the benefit of South African Patent Application No. 2013/03903, filed May 29, 2013, the disclosures of both applications being incorporated herein by reference.

FIELD OF THE INVENTION

The invention relates to systems and methods for verification and, more particularly, to systems and methods conducted at a secure element for verifying a mobile device interacting with the secure element.

BACKGROUND

In many developing countries or rural areas, it may only be a small portion of the population who have access to banking services from traditional brick-and-mortar banks. In such areas, a bank may be physically located too far away for a majority of the population to travel to. And even if a bank is nearby, it may be the only bank location in the vicinity of a vast region covering a large number of the population. The brick-and-mortar bank may not have the resources and capacity to adequately support such a large number of customers, possibly resulting in long waiting times and inconvenience for the bank's customers. In most developing countries, building additional bank branches and/or installing automated teller machines (ATMs) at various locations are often not viable solutions due to the high costs of the complex infrastructure involved.

In recent years, the use of mobile devices in developing countries has grown rapidly. As such, one way of providing these communities with access to financial and/or banking services is to enable users of mobile devices to perform mobile transactions, such as making mobile payments or money transfers, or checking account balances or performing other account related services, directly from their mobile devices. However, security concerns are often a stumbling block that hinders the wide adoption and growth of mobile banking.

Most mobile devices, especially older generation models that are typically used in developing countries, lack the capability to securely send end-to-end encrypted communication. As a result, sensitive information, such as a Personal Identification Numbers (PINs) and Primary Account Numbers (PANs), might be sent in plaintext form, creating a vulnerability in which such sensitive information can be intercepted by malicious parties and be used for fraudulent purposes.

Secure elements have been provided in an attempt to mitigate mobile devices' vulnerability to fraudulent attack, however there may still be weaknesses not addressed by such secure elements.

There is accordingly a need for a solution which addresses these and other problems, at least to some extent.

BRIEF SUMMARY

In accordance with a first aspect of the invention, there is provided a method of verification conducted at a secure element interacting with a mobile device and comprising: receiving at least one of an identifier of a universal integrated circuit card (UICC) and an identifier of the mobile device; comparing each of the received at least one identifiers against a registered identifier of corresponding form stored in a non-volatile memory of the secure element; and, if the received at least one identifiers match corresponding registered identifiers stored in the non-volatile memory, permitting further interaction with the mobile device; or, if at least one of the received identifiers do not match corresponding registered identifiers stored in the non-volatile memory, denying further interaction with the mobile device.

A further feature of the invention provides for the secure element to be a hardware security module having a tamper-resistant secure cryptoprocessor and a secure memory providing the non-volatile memory.

Still further features of the invention provide for the secure element to be a hardware security module having a public processing unit with memory and a secure processing unit with secure memory providing the non-volatile memory, for the secure processing unit to be logically and physically separated from the public processing unit, and for the method to include steps of: the public processing unit determining whether an incoming communication is authorized; and, if the incoming communication is authorized, transmitting the communication to the secure processing unit.

A yet further feature of the invention provides for the identifier of the mobile device to be a permanent identifier uniquely associated with the mobile device and the identifier of the UICC to be a permanent identifier uniquely associated with the U ICC.

Further features of the invention provide for the method to include initial registration steps of: receiving at least one of the identifier of the UICC and the identifier of the mobile device; and, registering the received at least one identifiers in the non-volatile memory of the secure element so as to initialize the secure element.

Still further features of the invention provide for the secure element to be one of the group of: a secure element disposed in a cryptographic expansion device; a secure element disposed in the mobile device; a cloud-based secure element using host card emulation; and a secure element disposed in the UICC, and for the initial registration steps to be conducted upon a user activating an authorized mobile software application resident in and installed on the mobile device or the secure element for the first time.

Yet further features of the invention provide for the secure element to be one of the group of: a secure element disposed in a cryptographic expansion device; a cloud-based secure element using host card emulation; and a secure element disposed in the UICC, and for the initial registration steps to be conducted upon a user powering the mobile device after inserting the UICC or the cryptographic expansion device for the first time therein.

A still further feature of the invention provides for the method to include a step of requesting at least one of an identifier of the UICC and an identifier of the mobile device from the mobile device or UICC associated therewith, as the case may be, with which the secure element is interacting.

In accordance with a second aspect of the invention, there is provided a secure element for interacting with a mobile device, comprising: an identifier receiving component for receiving at least one of an identifier of a universal integrated circuit card (UICC) and an identifier of the mobile device; a non-volatile memory for storing registered identifiers for at least one of the UICC and the mobile device; a comparing component for comparing each of the received at least one identifiers against a registered identifier of corresponding form stored in the non-volatile memory; and, a verifying component for permitting further interactions with the mobile device only if the received at least one identifiers match corresponding registered identifiers stored in the non-volatile memory.

A further feature of the invention provides for the secure element to be a hardware security module having a tamper-resistant secure cryptoprocessor and a secure memory providing the non-volatile memory.

Still further features of the invention provide for the secure element to be a hardware security module having a public processing unit with memory and a secure processing unit with secure memory providing the non-volatile memory, for the secure processing unit to be logically and physically separated from the public processing unit, and for the public processing unit to be configured to serve as a gatekeeper to prevent unauthorized communications from being sent to the secure processing unit.

A yet further feature of the invention provides for the identifier of the mobile device to be a permanent identifier uniquely associated with the mobile device and the identifier of the UICC to be a permanent identifier uniquely associated with the U ICC.

A further feature of the invention provides for the non-volatile memory of the secure element in which registered identifiers for at least one of the UICC and the mobile device are stored to be a write once read many (WORM) data storage memory which can be written to only once.

A still further feature of the invention provides for the secure element to further include a registration component for registering the received at least one identifiers in the non-volatile memory of the secure element so as to initialize the secure element.

In accordance with a third aspect of the invention, there is provided a system for verification including a secure element and a mobile device, the secure element comprising: an identifier receiving component for receiving at least one of an identifier of a universal integrated circuit card (UICC) and an identifier of the mobile device; a non-volatile memory for storing registered identifiers for at least one of the UICC and the mobile device; a comparing component for comparing each of the received at least one identifiers against a registered identifier of corresponding form stored in the non-volatile memory; and, a verifying component for permitting further interactions with the mobile device only if the received at least one identifiers match corresponding registered identifiers stored in the non-volatile memory.

Further features of the invention provide for the system to include a UICC, for the UICC to be a subscriber identity module (SIM) card, and for the identifier of the UICC to be at least one of an Integrated Circuit Card Identifier (ICCID) and an International Mobile Subscriber Identity (IMSI) number.

A still further feature of the invention provides for the identifier of the mobile device to be one or more of the group of: a unique device identifier; an International Mobile Station Equipment Identity (IMEI) number; and a media access control address.

Yet further features of the invention provide for the secure element to be disposed in the mobile device, and for the secure element to be electrically coupled to and in communication with the mobile device.

Further features of the invention provide for the secure element to be disposed in the UICC, and for the secure element to be electrically coupled to and in communication with the mobile device via electrical contacts of the UICC and corresponding electrical contacts of a UICC reader of the mobile device.

Still further features of the invention provide for the secure element to be disposed in a cryptographic expansion device including: a first set of electrical contacts for interfacing to the mobile device; a second set of electrical contacts for interfacing to the UICC; and, a coupling element configured to attach the cryptographic expansion device to the UICC card.

Yet further features of the invention provide for the secure element to be a cloud-based secure element using host card emulation, and for the secure element to be in communication with the mobile device over a mobile communication network.

In accordance with a fourth aspect of the invention, there is provided a computer program product for verification conducted at a secure element, the computer program product comprising a computer-readable medium having stored computer-readable program code for performing the steps of: receiving at least one of an identifier of a universal integrated circuit card (UICC) and an identifier of a mobile device; comparing each of the received at least one identifiers against a registered identifier of corresponding form stored in a non-volatile memory of the secure element; and, if the received at least one identifiers match corresponding registered identifiers stored in the non-volatile memory, permitting further interaction with the mobile device; or, if at least one of the received identifiers do not match corresponding registered identifiers stored in the non-volatile memory, denying further interaction with the mobile device.

Further features of the invention provide for the computer-readable medium to be a non-transitory computer-readable medium and for the computer-readable program code to be executable by a processing circuit.

In accordance with another aspect of the invention there is provided a method of verification conducted at a secure element interacting with a mobile device and comprising: receiving at least one of an identifier of a universal integrated circuit card (UICC) and an identifier of the mobile device; and, registering the received at least one identifiers in the non-volatile memory of the secure element so as to initialize the secure element such that, responsive to further interactions with the mobile device may be permitted only if received at least one identifiers match corresponding registered identifiers stored in the non-volatile memory.

In accordance with yet another aspect of the invention there is provided a method of associating an uninitialized cryptographic expansion device with one or both of a Subscriber Identity Module (SIM) card and a mobile device, the method comprising: coupling the cryptographic expansion device to the SIM card of the mobile device; receiving one or both of an identifier of the SIM card and an identifier of the mobile device; storing the one or more identifiers in non-volatile memory of the cryptographic expansion device; and comparing, responsive to a subsequent use of the cryptographic expansion device, the stored identifiers against corresponding identifiers of the SIM card and/or mobile device to which the cryptographic expansion device is coupled to determine whether or not the cryptographic expansion device is coupled to the same SIM card and/or mobile device to which it was coupled when the one or more identifiers were stored in the non-volatile memory.

Further features of the invention provide for the step of coupling the cryptographic expansion device to the SIM card of the mobile device to include physically coupling the cryptographic expansion device to the SIM card and physically coupling the cryptographic expansion device to the mobile device, the mobile device providing electrical power and communication signals such that the cryptographic expansion device is operable to receive electrical communication signals from the mobile device and SIM card.

A still further feature of the invention provides for the step of receiving an identifier of the SIM card to be preceded by requesting an identifier from the SIM card.

A yet further feature of the invention provides for the step of receiving an identifier of the mobile device to be preceded by requesting an identifier from the mobile device.

In accordance with another aspect of the invention, there is provided a cryptographic expansion device comprising: a first set of electrical contacts disposed on a top side of the cryptographic expansion device for interfacing to a mobile device; a second set of electrical contacts disposed on a bottom side of the cryptographic expansion device for interfacing to a SIM card; a coupling element configured to attach the cryptographic expansion device to the SIM card; and a hardware security module disposed in the cryptographic expansion device and coupled to the first and second sets of electrical contacts, wherein the hardware security module includes a secure processing unit with a secure memory, at least some of which is configured to be write once read many (WORM) memory configured to receive one or both of an identifier of the SIM card and an identifier of the mobile device and to store the one or more identifiers in non-volatile memory of the cryptographic expansion device.

DETAILED DESCRIPTION

Figure 1:
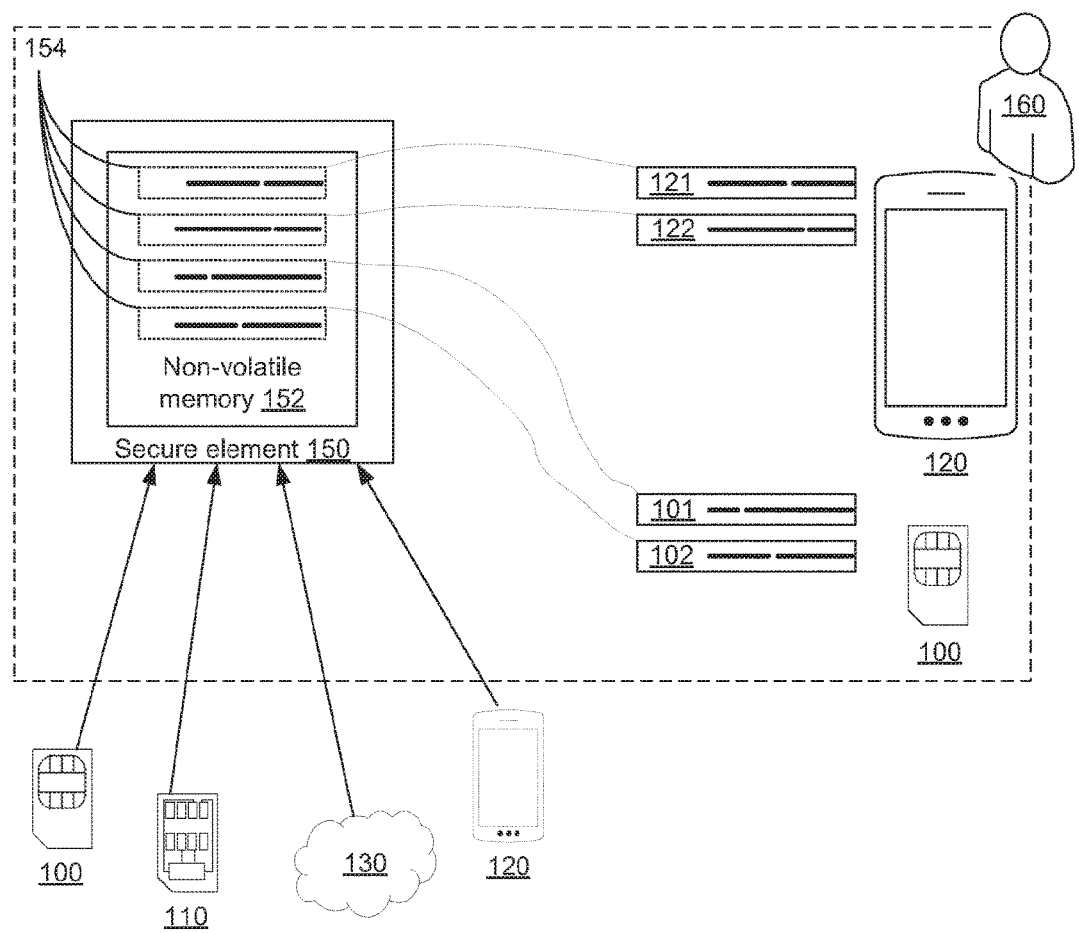
FIG. 1 is a schematic diagram which illustrates a system according to embodiments of the invention.

FIG. 1 is a schematic diagram which illustrates a system according to embodiments of the invention. The system includes a universal integrated circuit card (UICC) (100) and a mobile device (120). The UICC may be coupled to and in electrical communication with the mobile device. The system also includes a secure element (150) associated with the mobile device (120). Embodiments of the invention anticipate the secure element (150) being provided by one of the group of: the UICC (100); a cryptographic expansion device (110); the mobile device (120); and a cloud computing platform (130).

For example, in one embodiment, the secure element (150) may be disposed in the mobile device (120). The secure element (150) may be coupled to and in electrical communication with a mainboard of the mobile device (120).

In another embodiment, the secure element (150) may be disposed in the UICC (100). By inserting the UICC (100) into a UICC reader of the mobile device (120), the secure element (150) may receive electrical power and communication signals via, for example, electrical contacts of a UICC reader and UICC.

In yet another embodiment of the invention, the secure element (150) may be a cloud-based secure element provided by, for example, a cloud computing platform (130). The mobile device (120) may be configured to communicate with the cloud-based secure element via a mobile communication network. A cloud-based secure element may enable the mobile device (120) to perform host card emulation operations. Host card emulation (HCE) may enable the presentation of a virtual and exact representation of a smart card (for example representing payment credentials) by the mobile device (120) using only software. HCE may, for example, enable a user (160) securely to conduct mobile payments using the mobile device (120) without requiring the mobile device to have built-in hardware security.

In a further embodiment, the secure element (150) may be disposed in a cryptographic expansion device (110). The cryptographic expansion device (110) may, for example, have the form factor of a micro-secure digital (micro-SD) card, a layer or sticker configured to be placed between the UICC (100) and the UICC reader of the mobile device (120) or the like.

Accordingly, the mobile device (120) is in communication with the secure element (150). The secure element (150) may be capable of running a secure operating system and may provide secure key management to generate cryptographic keys, set the capabilities and security limits of keys, implement key backup and recovery, prepare keys for storage and perform key revocation and destruction. The secure element (150) may also encrypt data, user input and the like. In some embodiments, the secure element (150) may store payment credentials or other sensitive information relating to the user (160) of the mobile device (120).

The secure element (150) may be a hardware security module having a tamper-resistant secure cryptoprocessor and a secure memory which provides a non-volatile memory (152). In some embodiments of the invention, the secure element (150) is a hardware security module which has a public processing unit with memory and a secure processing unit with secure memory. The non-volatile memory (152) may be provided by the secure memory. The secure processing unit may be logically and physically separated from the public processing unit and the public processing unit may be configured to serve as a gatekeeper to prevent unauthorized communications from being sent to the secure processing unit.

A mobile software application may be resident in and installed on the secure element (150) or the mobile device (120) which may allow the user (160) to interact with the secure element (150). The mobile software application may enable the user (160) to input data or instructions into the secure element (150), receive notifications or secure notifications, initiate cryptographic operations, and the like. In some embodiments, the mobile software application is a mobile payment application configured to enable the user (160) to conduct financial transactions using his or her mobile device (120).

The mobile device (120) may be any appropriate mobile communication device such as one or more of the group of: a smartphone, a feature phone, a wearable computing device, a portable media player, a tablet computer, a personal digital assistant, a laptop computer, or the like. The mobile device (120) has at least one permanent identifier (121, 122) uniquely associated therewith. Exemplary identifiers (121, 122) include: a unique device identifier; an International Mobile Station Equipment Identity (IMEI) number; and a media access control address.

The mobile device (120) may provide a wireless communication functionality to enable it to communicate with other mobile devices, the Internet and other services over a wireless communication network. In the illustrated embodiment, in order to enable this wireless communication functionality, for example to identify a user to the mobile communication network, the mobile device (120) has a UICC (100) removably embedded therein and in electrical communication therewith. In other embodiments of the invention, the mobile device may be provided without the UICC.

The UICC (100) may too have at least one permanent identifier (101, 102) uniquely associated therewith. In the illustrated embodiment, the UICC (100) is a subscriber identity module (SIM) card and exemplary identifiers of the UICC may include one or both of an Integrated Circuit Card Identifier (ICCID) and an International Mobile Subscriber Identity (IMSI) number.

Embodiments of the present invention are directed towards systems, methods and devices for verification and, more particularly, for verifying at least one of the mobile device (120) and UICC (100) coupled thereto which is interacting with the secure element (150). For example, the secure element (150) according to embodiments of the invention may be configured to interact only with: a particular mobile device (120); a particular mobile device (120) having a particular UICC (100) coupled thereto; or, a particular UICC (100).

Accordingly upon initial activation, the secure element (150) according to embodiments of the invention may be configured to receive at least one of an identifier (101, 102) of the UICC (100) and an identifier (121, 122) of the mobile device (120) and to register the received identifiers (101, 102, 121, 122) by storing the received identifiers in the non-volatile memory (152) of the secure element so as to initialize the secure element (150) and to uniquely associate it with at least one of the mobile device (120) and the UICC (100).

Upon subsequent interaction with the mobile device (120), the secure element (150) may be configured to request and to receive at least one of an identifier (101, 102) of the UICC (100) and an identifier (121, 122) of the mobile device (120). The secure element (150) may then be configured to compare each of the received identifiers (101, 102, 121, 122) against a registered (154) identifier of corresponding form stored in the non-volatile memory (152) of the secure element (150).

If the received identifiers (101, 102, 121, 122) match corresponding registered identifiers (154) stored in the non-volatile memory, the secure element (150) is configured to permit further interaction with the mobile device (120). If, on the other hand, at least one of the received identifiers (101, 102, 121, 122) do not match corresponding registered identifiers stored in the non-volatile memory, the secure element (150) is configured to deny further interaction with the mobile device (120).

Figure 2:
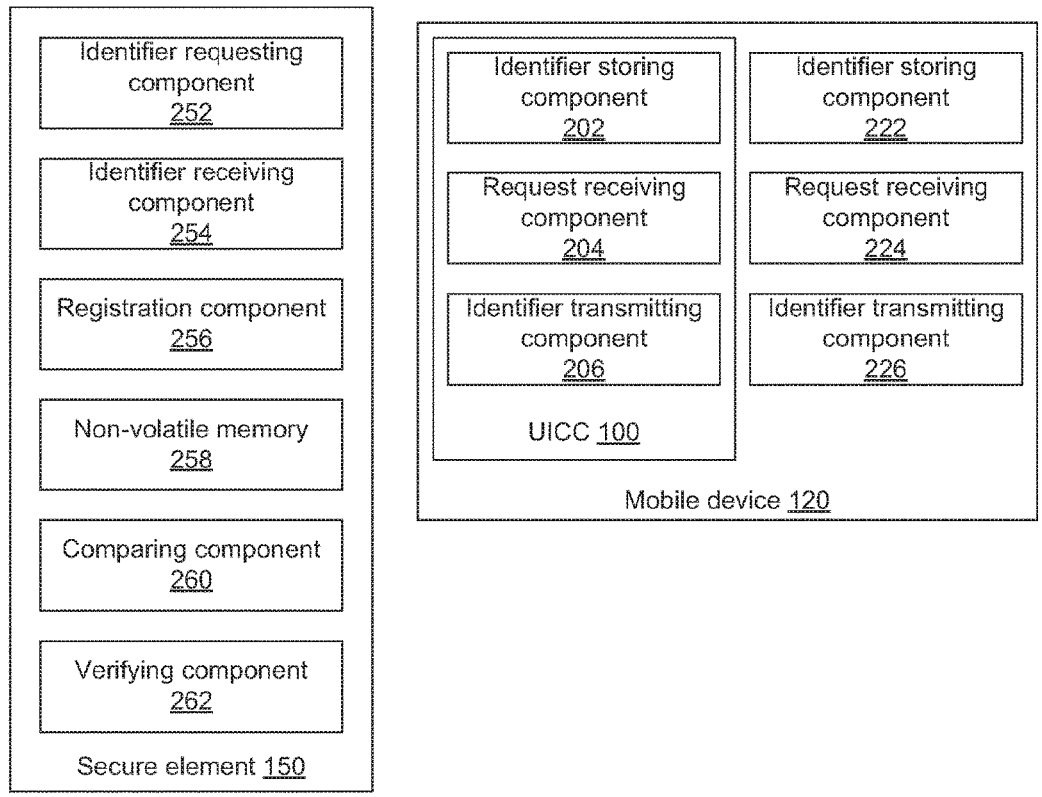
FIG. 2 is a block diagram which illustrates components of a system according to embodiments of the invention.

FIG. 2 is a block diagram which illustrates components of a system according to embodiments of the invention. The system includes a universal integrated circuit card (UICC) (100), a mobile device (120) and a secure element (150).

The secure element (150) has an identifier requesting component (252) for requesting at least one of an identifier of the UICC (100) and an identifier of the mobile device (120). The secure element also includes an identifier receiving component (254) for receiving at least one of an identifier of the UICC (100) and an identifier of the mobile device (120).

The identifier requesting component (252) and the identifier receiving component (254) may be used by the secure element (150) in an initial registration stage. Accordingly, the secure element may also include a registration component (256) for registering the received at least one identifiers in a non-volatile memory (258) of the secure element so as to initialize the secure element. The non-volatile memory (258) is for storing the registered identifiers for at least one of the UICC (100) and the mobile device (120). The non-volatile memory (258) may be a write once read many (WORM) data storage memory which can be written to only once. The non-volatile memory (258) may be implemented in a secure memory of the secure element (150).

The secure element (150) may also make use of the identifier requesting component (252) and the identifier receiving component (254) in a verification stage. A comparing component (260) is provided for comparing each of the received at least one identifiers against the registered identifier of corresponding form stored in the non-volatile memory (258) of the secure element (150). The secure element (150) also includes a verifying component (262) for permitting further interactions with the mobile device (120) only if the received at least one identifiers match corresponding registered identifiers stored in the non-volatile memory (258).

The mobile device has an identifier storing component (222) for storing at least one permanent identifier uniquely associated with the mobile device (120). The mobile device (120) also includes a request receiving component (224) for receiving a request for an identifier of the mobile device (120) from the secure element (150) and an identifier transmitting component (226) for transmitting the identifier to the secure element (150). In another embodiment, the identifier transmitting component (226) may be for transmitting the identifier of the mobile device to the UICC (100). This transmission may be intercepted by the secure element (150). Alternatively the UICC (100) may, upon receiving the identifier of the mobile device, transmit the identifier of the mobile device along with the identifier of the UICC to the secure element (150).

Similarly, the UICC (100) has an identifier storing component (202) for storing at least one permanent identifier uniquely associated with the UICC (100) and a request receiving component (204) for receiving a request for an identifier of the UICC (100) from the secure element (150). The UICC (100) further includes an identifier transmitting component (206) for transmitting the identifier of the UICC to the secure element (150). In another embodiment, the identifier transmitting component (206) may be for transmitting the identifier of the UICC to the mobile device (120). This transmission may be intercepted by the secure element (150). Alternatively the mobile device (120) may, upon receiving the identifier of the UICC, transmit the identifier of the UICC along with the identifier of the mobile device to the secure element (150).

In some embodiments of the invention, the secure element does not request identifiers from the mobile device or UICC, but is rather configured to intercept the identifiers, for example, as they are transmitted from the mobile device to the UICC or vice versa.

Figure 3A:
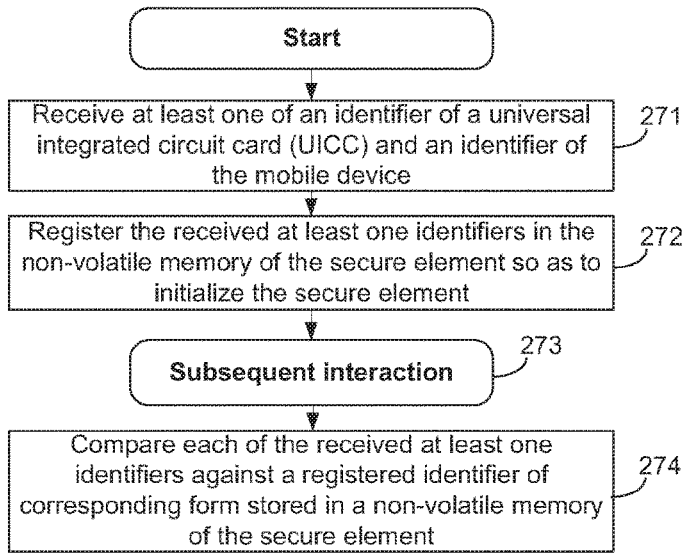
FIG. 3A is a flow diagram which illustrates methods of verification according to embodiments of the invention.
Figure 3B:
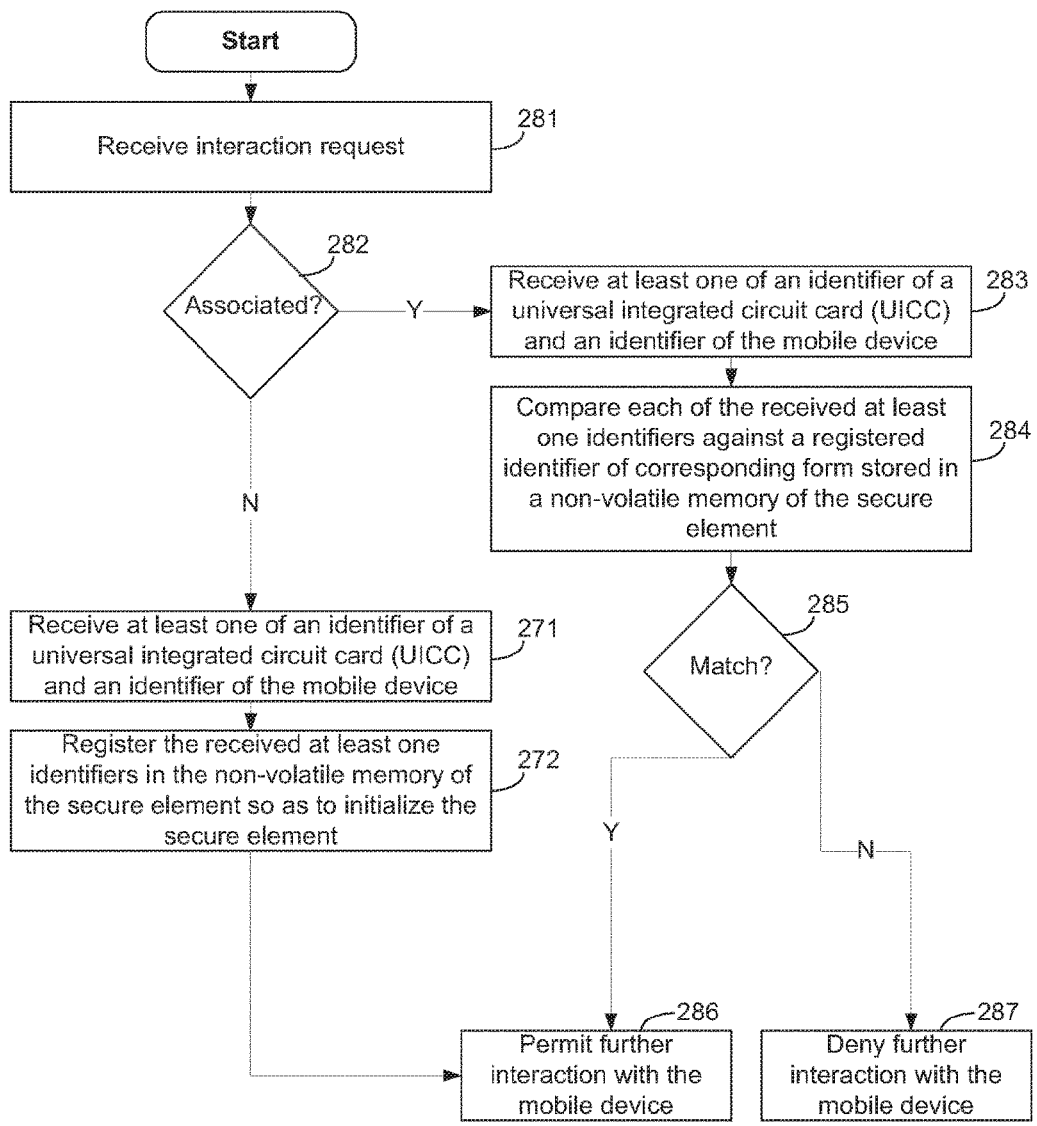
FIG. 3B is a flow diagram which illustrates methods of verification according to embodiments of the invention.

FIGS. 3A and 3B are flow diagrams which illustrate methods of verification according to embodiments of the invention. The methods are conducted at a secure element.

FIG. 3A is a flow diagram which illustrates a initial registration steps of method of verification which is conducted at a secure element which has not been initialized or has not been associated with a mobile device or UICC. As such, the method may associate an uninitialized secure element with at least one of a UICC and a mobile device.

Initially, according to embodiments of the invention wherein the secure element is one of the group of: a secure element disposed in a cryptographic expansion device; a secure element disposed in the mobile device; a cloud-based secure element using host card emulation; and a secure element disposed in the UICC, a user may activate an authorized mobile software application resident in and installed on the mobile device or the secure element for the first time to initiate initial registration steps.

Alternatively, according to embodiments of the invention wherein the secure element is one of the group of: a secure element disposed in a cryptographic expansion device; a cloud-based secure element using host card emulation; and a secure element disposed in the UICC, the initial registration steps may be initiated upon a user powering the mobile device after inserting, for the first time, the UICC or the cryptographic expansion device therein.

In response to the user powering the mobile device or activating the secure element for the first time, in a first step (271), the secure element receives at least one of an identifier of the UICC and an identifier of the mobile device.

This step (271) may include a step in which the secure element requests an identifier from the UICC. Alternatively in accordance with some embodiments of the invention, the secure element may intercept a transmission between the UICC and the mobile device which contains an identifier of the UICC and extract the identifier therefrom. The identifier of the UICC received at the secure element may be an Integrated Circuit Card Identifier (ICCID), an International Mobile Subscriber Identity (IMSI) number or any other permanent identifier uniquely associated with the UICC.

Similarly, this step (271) may include a step in which the secure element requests an identifier from the mobile device. Alternatively in accordance with some embodiments of the invention, the secure element may intercept a transmission between the mobile device and the UICC containing the identifier of the mobile device so as to extract the identifier of the mobile device. The identifier of the mobile device may be an International Mobile Station Equipment Identity (IMEI) number or any other permanent identifier uniquely associated with the mobile device.

In a next step (272), the secure element registers the received at least one identifiers in a non-volatile memory of the secure element so as to initialize the secure element and to associate it with at least one of the mobile device and the UICC.

The non-volatile memory of the secure element in which the received at least one identifiers are stored may be a write once read many (WORM) data storage memory in that the memory can be written to only once. The non-volatile memory of the secure element may be implemented in a secure memory of the secure element.

After the above steps (271, 272) have been performed, the secure element may continue to function as designed. The secure element may permit further interaction with the mobile device by, for example, enabling the mobile device to send and receive end-to-end secure encrypted communications. The end-to-end secure communications enabled by the secure element may be utilized by a user of the mobile device to perform, for example, financial transactions and/or banking transactions.

At a later point, the mobile device may initiate further interaction with the secure element. According to some embodiments of the invention, for example, subsequent interaction could be initiated after the secure element has been re-powered. De-powering could indicate removal of the secure element according to some embodiments of the invention from the UICC and recoupling to, either to the same UICC and/or mobile device or to another UICC and/or mobile device).

Alternatively, further interaction may be initiated by the mobile device in response to a user opening a mobile software application resident in the mobile device or secure element. For example, the user may wish to make use of the secure element to perform cryptographic operations or request payment credentials.

As a result, in response to subsequent interaction (273) the mobile device, the secure element may, in a next step (274), compare each of the received at least one identifiers against a registered identifier of corresponding form stored in a non-volatile memory of the secure element and permit further interaction with the mobile device only if each of the received at least one identifiers match a corresponding registered identifier stored in the non-volatile memory.

The step (274) described above in relation to subsequent interaction (273) is described more thoroughly below with reference to FIG. 3B, a flow diagram which illustrates a method for verification according to embodiments of the invention.

In a first step (281), the secure element receives an interaction request from a mobile device. The interaction request may, for example be a request for end-to-end secure encrypted communications, encryption operations, decryption operations, a request for payment credentials or other payment operation, or the like.

The secure element may determine whether the secure element has already been associated with at least one of a mobile device and a universal integrated circuit card (UICC) by, for example checking in a registry or file. If (282) the secure element has already been associated with at least one of a mobile device and a UICC, the secure element may, in a next step (283), receive at least one of an identifier of a UICC and an identifier of the mobile device. In some embodiments, this step (283) may be preceded by a step of requesting at least one of an identifier of the UICC and an identifier of the mobile device from the mobile device or UICC associated therewith. In other embodiments, the received at least one identifiers may be received with the interaction request, whilst in other embodiments, they may be intercepted by the secure element.

In a following step (284), the secure element may compare each of the received identifiers against a registered identifier of corresponding form stored in a non-volatile memory of the secure element.

If (285) the received identifiers match corresponding registered identifiers stored in the non-volatile memory, the secure element may, in a next step (286) permit the requested further interaction with the mobile device. However, if (285) at least one of the received identifiers do not match corresponding registered identifiers stored in the non-volatile memory, the secure element may, in an alternative step (287) deny the requested further interaction with the mobile device.

However, if (282) the secure element has not been associated with at least one of a mobile device and a UICC (for example the secure element is uninitialized), the secure element may perform the initial registration steps (271, 272) described above with reference to FIG. 3A and subsequently, in a following step (286), permit interaction with the mobile device.

In some embodiments of the invention, the secure element is a hardware security module having a public processing unit with memory and a secure processing unit with secure memory. The secure memory may provide the non-volatile memory and the secure processing unit may be logically and physically separated from the public processing unit with the public processing unit being configured to act as a gatekeeper to the secure processing unit. Accordingly, the method described above with reference to FIGS. 3A and 3B may include, for each step requiring interaction with the mobile device or UICC, steps of: the public processing unit of the secure element determining whether an incoming communication is authorized; and, only if the incoming communication is authorized, transmitting the communication to the secure processing unit of the secure element.

Furthermore, in embodiments of the invention in which the secure element is disposed in a cryptographic expansion device which is configured for attachment to a UICC and a mobile device, the step (281) of receiving an interaction request may be received each time the cryptographic expansion device is powered up. For example, once the cryptographic expansion device is coupled to a mobile device and a UICC and receives an electrical power signal, the cryptographic expansion device may power up.

Embodiments of the invention accordingly provide a method for associating a secure element with (or locking a secure element to) at least one of a UICC and a mobile device such that the secure element may be unusable with any one of the group of: another mobile device; another UICC; or both another mobile device and another UICC.

Certain embodiments of the invention will now be described in greater detail. FIGS. 4A to 13 illustrate embodiments of the invention in which the secure element is disposed in a cryptographic expansion device. In the embodiments described with reference to FIGS. 4A to 13, the secure element is a hardware security module (HSM) and the UICC is a SIM card. The HSM may be implemented as one or more integrated circuits which are disposed in the cryptographic expansion device, and which may include embedded processors and storage capabilities.

Although FIGS. 4A to 13 are directed towards an embodiment of the invention in which the secure element is disposed in a cryptographic expansion device, many of the features described or illustrated may also be provided correspondingly in embodiments of the invention described above with reference to FIGS. 1 to 3B in which the secure element is disposed in a mobile device or a UICC.

In some embodiments, the hardware security module may have a tamper-resistant secure cryptoprocessor and a secure memory providing the non-volatile memory. Furthermore, the hardware security module may have a public processing unit with memory and a secure processing unit with secure memory providing a non-volatile memory. The secure processing unit may be logically and physically separated from the public processing unit, such that the public processing unit may be configured to serve as a gatekeeper to prevent unauthorized communications from being sent to the secure processing unit.

When used with a SIM card in a mobile device the cryptographic expansion device provides the mobile device with the same set of security features as found in industry-standard HSMs or secure elements embedded in mobile devices. The term "SIM card" as used in this description may refer to a SIM card application implemented on a Universal Integrated Circuit Card (UICC).

The cryptographic expansion device according to embodiments of the invention may be capable of running a secure operating system and may provide secure key management to generate cryptographic keys, sets the capabilities and security limits of keys, implements key backup and recovery, prepares keys for storage and performs key revocation and destruction. The cryptographic expansion device may also encrypt data and user input using Data Encryption Standard (DES), Triple Data Encryption Standard/Algorithm (TDES/TDEA), DES-X, Secure Socket Layer (SSL), Advanced Encryption Standard (AES), Blowfish, Serpent, Twofish, Threefish, International Data Encryption Algorithm (IDEA), Rivest, Shamir, & Adleman (RSA), Digital Signature Algorithm (DSA), Tiny Encryption Algorithm (TEA), extended TEA (XTEA), and/or other encryption algorithms or protocols.

In some embodiments, the HSM of the cryptographic expansion device is implemented as a dual processor device that includes a Federal Information Processing Standards (FIPS)-compliant secure processor with storage and a public processor with storage. This division in hardware roles introduces a new level of security by providing a physical and logical separation between interfaces that are used to communicate critical security parameters and other interfaces that are used to communicate other data. Furthermore, the secure processor and storage component is inaccessible without the master key used during manufacturing.

An electronic device that solely uses software to encrypt communications may comply with only a security level 1 of the Federal Information Processing Standard 140-2 (FIPS 140-2), which provides only a minimum level of security to protect sensitive information. In contrast, an electronic device coupled to an HSM according to embodiments of the invention is compliant with at least a security level 2 of the FIPS 140-2 standard. More preferably, the electronic device is compliant with security level 3 or security level 4 of FIPS 140-2.

The HSM in embodiments of the invention uses hardware to encrypt data instead of solely performing the encryption in software. The HSM provides enhanced protection over software encryption technologies. For example, the HSM provides secure key management to generate cryptographic keys, sets the capabilities and security limits of keys, implements key backup and recovery, prepares keys for storage and performs key revocation and destruction.

At least one disadvantage of cryptographic expansion devices known to the art is that it may be possible to remove the expansion device from one SIM card and place it on another, for example, by peeling the cryptographic expansion device from a first SIM card to which it is attached and applying it to a second SIM card. In doing so, an unauthorized third party may be able to fraudulently make use of a user's cryptographic expansion device by removing it from the user's SIM card and placing it on a SIM card of the unauthorized third party.

Figure 4A:
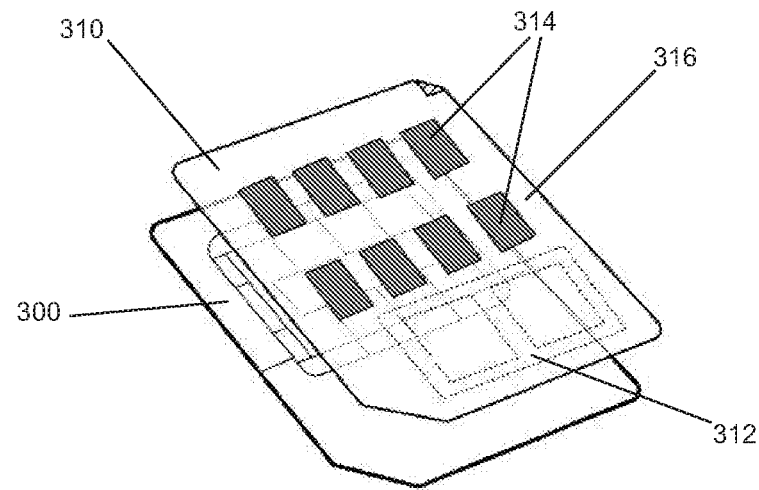
FIG. 4A is a perspective view of a cryptographic expansion device according to embodiments of the invention.

FIG. 4A illustrates cryptographic expansion device (310) according to embodiments of the invention which is configured to be associated with or locked to at least one of a mobile device or a SIM card coupled thereto. The cryptographic expansion device (310) has an embedded microchip (312) and can be applied directly to a SIM card (300). The embedded microchip (312) includes the embedded processors and storage capabilities for performing the HSM security features described above. The cryptographic expansion device (310) has a planar area that is substantially the same size as the SIM card (300). The cryptographic expansion device (310) has a first set of electrical contacts (314) disposed on a top side (316) thereof to interface with a SIM card reader of a mobile device (not shown), and a second set of electrical contacts (not shown) on a bottom side thereof to interface with the SIM card (300). The footprint of the SIM card (300) provides limited space around the perimeter of the electrical contact region. As a result, in this implementation of the cryptographic expansion device, the embedded microchip is disposed between the first (314) and second sets of electrical contacts of the cryptographic expansion device (310). In other embodiments of the invention, the cryptographic expansion device may be implemented as a card or a holder into which a SIM card is inserted.

Figure 4B:
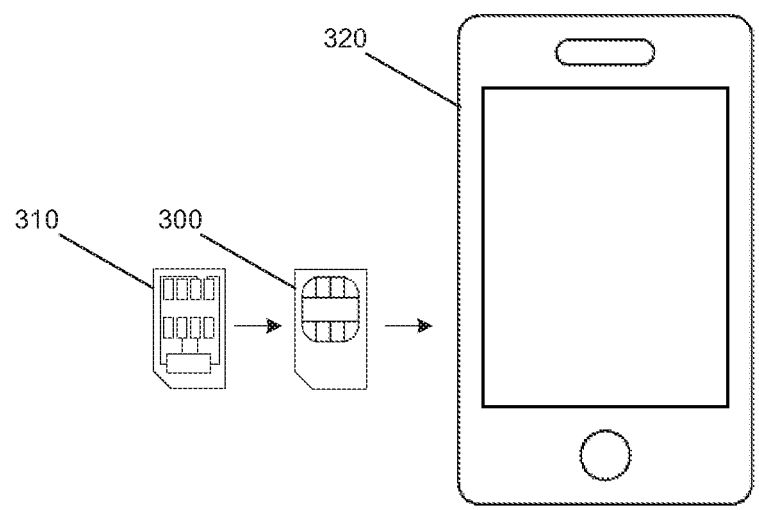
FIG. 4B is a schematic illustration of a cryptographic expansion device which can be fitted to a SIM card.

FIG. 4B is a schematic illustration of a cryptographic expansion device (310) which can be fitted to a SIM card (300). The SIM card (300) with attached cryptographic expansion device (310) can be inserted into a SIM card receiving slot or a SIM card reader of a mobile device (320) to enable the mobile device to perform secure communications as described above.

By attaching the cryptographic expansion device (310) to the SIM card (300) and inserting the combination thereof into a SIM card receiving slot or a SIM card reader of a mobile device (320), electrical contact points disposed on a top side and a bottom side of the cryptographic expansion device (310) align with corresponding electrical contact points of the mobile device (320) and the SIM card (300) respectively so as to enable the cryptographic expansion device (310) to receive electrical power and communication signals from the mobile device (320) and SIM card (300) and to intercept transmissions between the mobile device (320) and SIM card (300).

Embodiments of the invention are directed at associating the cryptographic expansion device (310) with (or 'locking' it to) at least one of the mobile device (320) and the SIM card (300) such that the cryptographic expansion device may only be operable (i.e. to permit interaction) when coupled to the corresponding SIM card and/or mobile device with which it is associated (or to which it is locked).

For example, the cryptographic expansion device (310) may be configured at manufacture to be a mobile device-locked cryptographic expansion device, in which case the methods described above may be carried out making use of a mobile device identifier (e.g. an IMEI) only. Similarly, the cryptographic device may be configured at manufacture to be a SIM card-locked cryptographic expansion device, in which case the methods described above may be carried out making use of a SIM card identifier (e.g. an UCCID) only. The cryptographic expansion device may be configured at manufacture to be a user-locked cryptographic expansion device, in which case the methods described above may be carried out making use of a user identifier obtained from a SIM card (e.g. an IMSI number). The above configurations may be implemented in a variety of combinations, so as to enable a cryptographic expansion device to, for example, be locked to a user and a mobile device; a user and a SIM card; a user, a SIM card and a mobile device; a mobile device and a SIM card, or any other appropriate combination.

Figure 5:
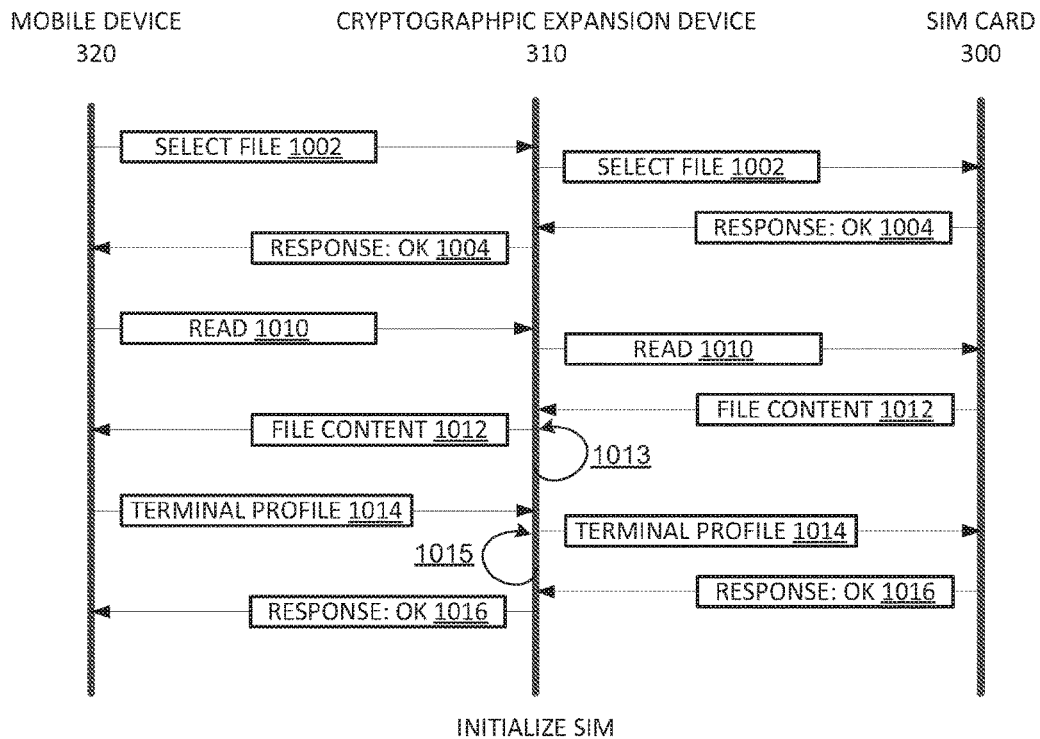
FIG. 5 is a flow diagram of a cryptographic expansion device initialization sequence according to one embodiment of the invention.

FIG. 5 illustrates a cryptographic expansion device initialization sequence according to one embodiment of the invention. The cryptographic expansion device is configured to perform the illustrated initial registration sequence the first time the cryptographic expansion device is powered up in a mobile device. When the mobile device (320) powers up or is turned on, the mobile device (320) issues a series of select file and read commands to the SIM card reader of the mobile device (320) to read subscriber information from the SIM card (300) to register the SIM card (300) with a mobile network. Because the cryptographic expansion device is located between the SIM card (300) and the mobile device (320), when the cryptographic expansion device (310) receives these commands from mobile device (320), the cryptographic expansion device (310) passes through or forwards these commands to the SIM card (300).

For example, after power up, the mobile device (320) may send a select file command (1002) to select a designated file in the file system of the SIM card (300) that stores subscriber information or other types of SIM card related information. Upon receiving the select file command (1002), the cryptographic expansion device (310) determines that the file being requested is a file in the file system of the SIM card (300), and passes through or forwards the select file command (1002) to the SIM card (300). The SIM card (300) receives the select file command (1002), accesses the requested file, and sends a response (1004) towards the cryptographic expansion device (310) indicating that the requested file was accessed successfully and is ready to be read. The cryptographic expansion device (310) then passes through or forwards the response (1004) to the mobile device (320). In response to receiving the response (1004) notifying the mobile device (320) that the requested file is ready to be read, the mobile device (320) sends a read command (1010) towards the SIM card (300). Upon receiving the read command (1010), the cryptographic expansion device (310) passes through or forwards the read command (1010) to the SIM card (300). In response to the read command (1010), the SIM card (300) sends file content (1012) of the requested file towards the mobile device (320). Depending on the file being requested, file content (1012) may include subscriber information, such as an International Mobile Subscriber Identity (IMSI) number, location/region information, configuration information such as language preference, and/or other types of SIM card information, such as an Integrated Circuit Card Identifier (ICCID). Upon receiving the file content (1012), the cryptographic expansion device (310) is configured to identify an IMSI number or ICCID in the file content. The cryptographic expansion device (310) is then configured to write (1013) either the IMSI number or ICCID, or both, to a non-volatile, write-once read-many memory of the cryptographic expansion device (310). The cryptographic expansion device (310) then passes through or forwards the file content (1012) to the mobile device (320). The above series of commands and exchange of information may occur multiple times to allow the mobile device (320) to read any information stored in the SIM card (300) that the mobile device (320) may use during its SIM card initialization sequence.

After the mobile device (320) finishes reading the information stored in the SIM card (300), the mobile device (320) may send a terminal profile (1014) towards the SIM card (300) to inform the SIM card (300) of the properties and capabilities of the mobile device (320). The terminal profile may include properties of the mobile device such as the types of communication interfaces available on the mobile device and may also include a mobile device identifier, such as an International Mobile Station Equipment Identity (IMEI) number. Upon receiving the terminal profile (1014), the cryptographic expansion device (310) may inspect the terminal profile (1014) to learn the properties and capabilities of the mobile device (320) and is also configured to identify the IMEI number. In some embodiments of the invention, the cryptographic expansion device (310) may be configured to write the identified IMEI number to the non-volatile write-once read-many memory. In such an embodiment, IMEI number may be written (1015) to the non-volatile write-once read-many memory either together with the ICCID and/or IMSI number or alternatively instead of the ICCID and IMSI number. The cryptographic expansion device (310) then passes through or forwards the terminal profile (1014) to the SIM card (300). The SIM card (300) may send a response (1016) towards mobile device to indicate that terminal profile (1014) was successfully received. Upon receiving the response (1016), the cryptographic expansion device (310) passes through or forwards the response (1016) to the mobile device (320).

The steps described above with reference to FIG. 5 accordingly lock the cryptographic expansion device (310) to the SIM card (300) and/or the mobile device (320). This is done only once, the first time the cryptographic expansion device (310) is initialized in a mobile device. Thereafter, each time the cryptographic expansion device (310) is coupled to any mobile device and/or SIM card, the start-up sequence illustrated with reference to FIG. 6 is performed.

Figure 6:
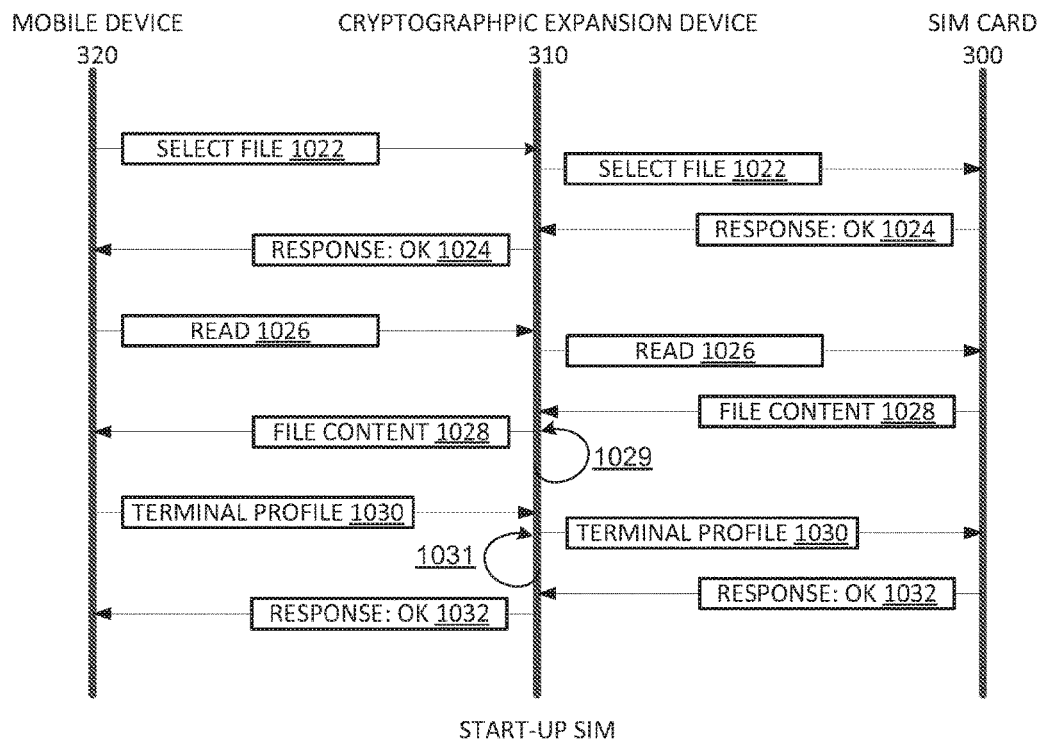
FIG. 6 illustrates a diagram showing the process of starting-up a SIM card in a mobile device equipped with a cryptographic expansion device, according to one embodiment of the invention.

FIG. 6 illustrates a SIM card start-up sequence where the cryptographic expansion device (310) has previously been initialized. The start-up sequence is performed each time an initialized cryptographic expansion device is powered up. The start-up sequence is similar to the initialization sequence described above with reference to FIG. 5. In one embodiment of the invention, the cryptographic expansion device (310) has already been initialized and is locked to a SIM card only. When the cryptographic expansion device receives file content (1028) from the SIM card (300), in the start-up sequence, containing an ICCID, the cryptographic expansion device is configured to compare (1029) the received ICCID to the ICCID stored in the non-volatile write once read many memory of the cryptographic expansion device (310). If the identifier is the same, the cryptographic expansion device (310) will continue to function as designed. If not, the cryptographic expansion device (310) may shut down, either permanently or for the duration that it is connected to an invalid SIM card. In some embodiments, tamper detection sensors of the cryptographic expansion device (310) may erase and wipe out at least some of the contents of the cryptographic expansion device (310) so as to render it unusable. Similarly, the cryptographic expansion device may be only locked to a user having a particular IMSI number.

In another embodiment of the invention, the cryptographic expansion device (310) has already been initialized and is locked to the mobile device (320) only. When the cryptographic expansion device (310) is coupled to a SIM card and mobile device, in the start-up sequence, it receives a terminal profile (1030) containing an IMEI number. The cryptographic expansion device (310) is configured to compare (1031) the received IMEI number to the IMEI number stored in the non-volatile write once read many memory. If the identifier is the same, the cryptographic expansion device (310) will continue to function as designed. If not, the cryptographic expansion device (310) may shut down, either permanently or for the duration that it is connected to an invalid mobile device. In some embodiments, tamper detection sensors of the cryptographic expansion device (310) may erase and wipe out the at least some of the contents of the cryptographic expansion device (310) so as to render it unusable.

With the cryptographic expansion device (310) having been successfully initialized and locked to a SIM card (300) and/or mobile device (320), a number of encryption/decryption functions for which the cryptographic device (310) is intended may be performed while the cryptographic expansion device remains coupled to the SIM card and/or mobile device to which it is locked. Some exemplary processes and functions are described below with reference to corresponding figures.

Figure 7:
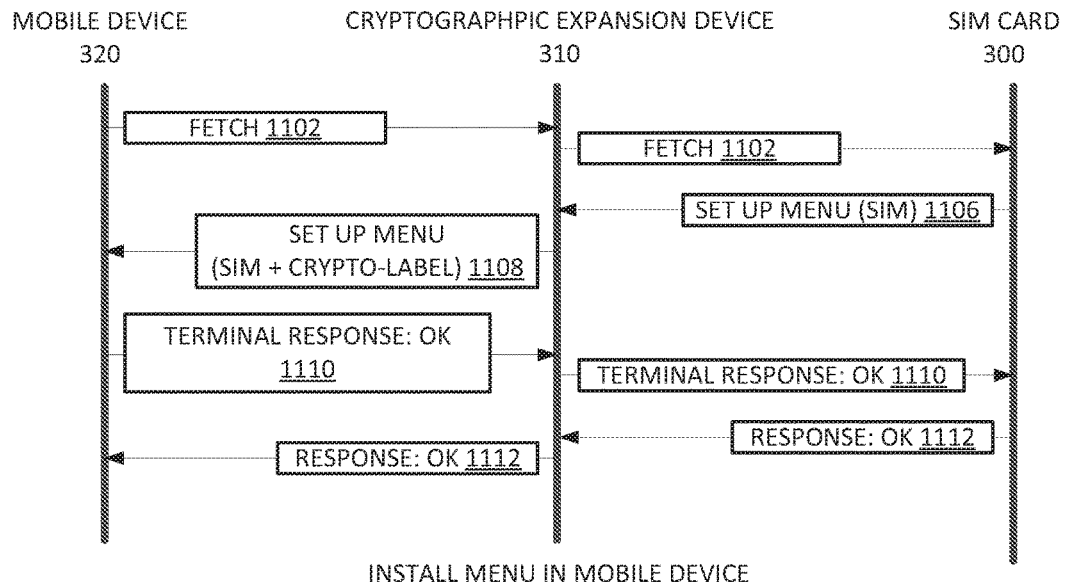
FIG. 7 illustrates a diagram showing the process of installing a user menu in a mobile device equipped with a cryptographic expansion device, according to one embodiment of the invention.

For instance, the process of installing a user menu that lists the features of the SIM card (300) and the cryptographic expansion device (310) onto the mobile device (320) according to one embodiment of the invention will be described with reference to FIG. 7. After the SIM card start-up sequence of FIG. 6 where the cryptographic expansion device is locked and coupled the mobile device (320) and/or SIM card (300) to which it is locked, the mobile device (320) may send a fetch command (1102) towards the SIM card (300) to obtain any pending commands that the SIM card (300) wants the mobile device (320) to perform. Upon receiving the fetch command (1102), the cryptographic expansion device (310) may pass through or forward the fetch command (1102) to the SIM card (300). The SIM card (300) may respond with a set-up-menu command (1106) that includes a list of features of the SIM card (300) to be included in the user menu of the mobile device (320). Upon receiving the set-up-menu command (1106) from the SIM card (300), the cryptographic expansion device (310) can add its own list of user selectable features to the features of the SIM card (300) listed in the set-up-menu command (1106), and generates a set-up-menu command (1108) that lists the features of both the SIM card (300) and the cryptographic expansion device (310). The list of features added by the cryptographic expansion device (310) can include, for example, mobile banking features such as a menu selection for making mobile payments, a menu selection for making mobile money transfer, a menu selection for a financial account inquiry, a menu selection for making a contactless payment, and/or other menu selections for services related to financial or banking transactions that a user can perform using the mobile device (320) equipped with the cryptographic expansion device (310). The cryptographic expansion device (310) then sends the set-up-menu command (1108) that includes the list of features of both the SIM card (300) and the cryptographic expansion device (310) to the mobile device (320). In response to receiving the set-up-menu command (1108), the mobile device (320) adds the list of features of the SIM card (300) and the cryptographic expansion device (310) to the user menu of the mobile device (320).

The mobile device (320) can send a terminal response (1110) towards the SIM card (300) to indicate that the user menu is set up successfully. Upon receiving the terminal response (1110), the cryptographic expansion device (310) passes through or forwards the terminal response (1110) to the SIM card (300). The SIM card (300) may reply with a response (1112) indicating acknowledgement of the terminal response (1110) towards the mobile device (320). The cryptographic expansion device (310) then passes through or forwards the response (1112) to the mobile device (320). The mobile device (320) can then display to a user the features and services that the cryptographic expansion device (310) can provide on the mobile device (320), and the user can select one or more features of the cryptographic expansion device (310) from the user menu of the mobile device (320) to send secure communication to perform various financial and/or banking transactions. A user can also select non-secure features of the SIM card (300), for example, to send unencrypted short messaging service (SMS) messages, from the user menu of the mobile device (320).

Figure 8:
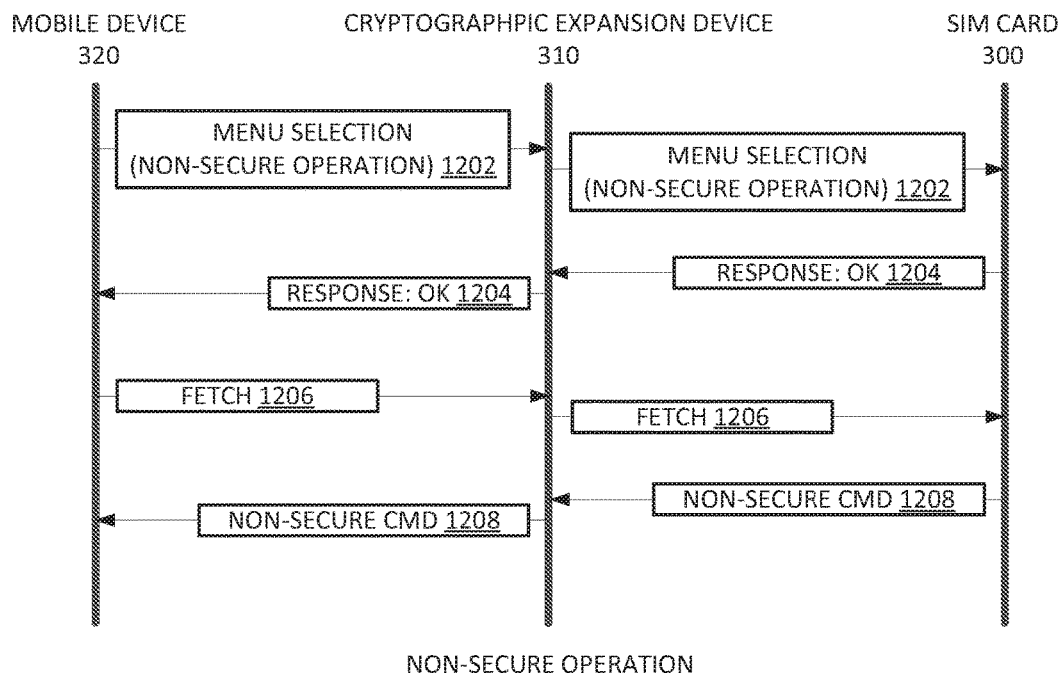
FIG. 8 illustrates a diagram showing the process of performing a non-secure operation in a mobile device equipped with a cryptographic expansion device, according to one embodiment of the invention.

FIG. 8 illustrates a non-secure operation being performed with the mobile device (320) using the SIM card (300), according to one embodiment, where the cryptographic expansion device (310) is locked and is coupled the mobile device (320) and/or SIM card (300) to which it is locked. When a user selects a feature of the SIM card (300) to perform a non-secure operation (e.g., send unencrypted SMS, or display a message stored on the SIM card (300), etc.) from the user menu of the mobile device (320), the mobile device (320) sends a menu selection command (1202) indicating the selection of the non-secure operation towards the SIM card (300). Upon receiving the menu selection command (1202), the cryptographic expansion device (310) determines that the menu selection command (1202) is requesting a feature of the SIM card (300). The cryptographic expansion device (310) then passes through or forwards the menu selection command (1202) to the SIM card (300). In response to receiving the menu selection command (1202), the SIM card (300) sends a response (1204) towards the mobile device (320) to indicate the menu selection command (1202) has been received. The SIM card (300) processes the menu selection command (1202) and prepares one or more device commands to send to the mobile device (320) to carry out the non-secure operation being requested.

Upon receiving the response (1204) indicating the menu selection command (1202) has been received by the SIM card (300), the cryptographic expansion device (310) passes through or forwards the response (1204) to the mobile device (320). The mobile device (320) may then send a fetch command (1206) towards the SIM card (300) to obtain any pending commands that the SIM card (300) wants the mobile device (320) to perform to carry out the non-secure operation selected by the user. Upon receiving the fetch command (1206), the cryptographic expansion device (310) passes through or forwards the fetch command (1206) to the SIM card (300). The SIM card (300) responds to the fetch command (1206) by sending a device command (1208) towards the mobile device (320) to instruct the mobile device (320) to perform one or more functions of the mobile device (320) to carry out the non-secure operation. For example, the device command (1208) may instruct the mobile device (320) to send an unencrypted SMS over the cellular interface of the mobile device (320), or display a stored SMS message on the screen of the mobile device (320). Upon receiving the device command (1208) from the SIM card (300), the cryptographic expansion device (310) passes through or forwards the device command (1208) to the mobile device (320). The mobile device (320) then executes the device command (1208) to carry out the non-secure operation requested by the user.

Figure 9:
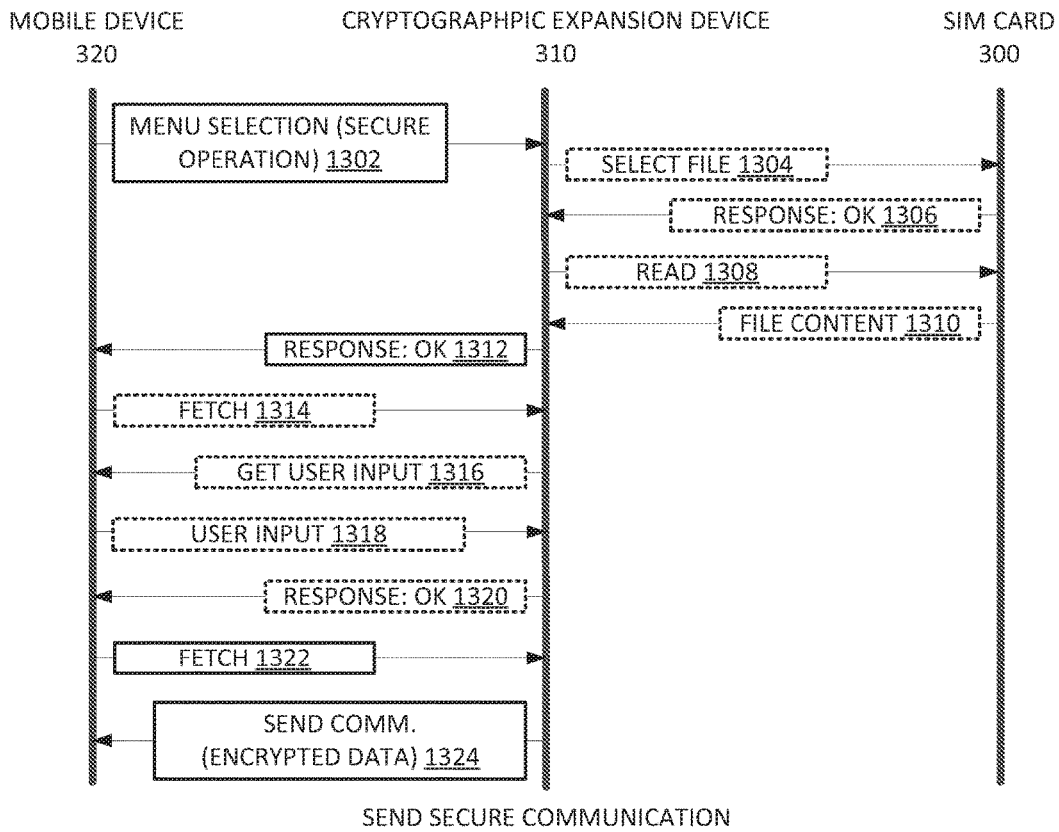
FIG. 9 illustrates a diagram showing the process of performing a secure operation in a mobile device equipped with a cryptographic expansion device, according to one embodiment of the invention.

FIG. 9 illustrates a secure communication being sent from the mobile device (320) using the cryptographic expansion device (310), according to one embodiment, where the cryptographic expansion device (310) is locked and is coupled the mobile device (320) and/or SIM card (300) to which it is locked. When a user selects a secure application such as a mobile banking application in the cryptographic expansion device (310) from the user menu of the mobile device (320) to perform a secure operation such as a financial and/or banking transaction, for example, to make a mobile payment or to check an account balance, the mobile device (320) sends a menu selection command (1302) indicating the secure operation the user wants to perform to the cryptographic expansion device (310). Upon receiving the menu selection command (1302), the cryptographic expansion device (310) determines that the menu selection command (1302) is requesting a secure application of the cryptographic expansion device (310) to perform a secure operation.

Depending on the secure operation selected by the user, the cryptographic expansion device (310) may optionally retrieve information stored in the cryptographic expansion device (310) such as an encrypted personal identification number (PIN) to carry out the secure operation. In some embodiments, certain information stored in the SIM card (300) may also be used to carry out the secure operation. For example, the secure operation may include sending a secure communication from the mobile device (320) to a recipient device, and the unique serial number (ICCID) of the SIM card (300) and/or the international mobile subscriber identity (IMSI) of the SIM card (300) may be included in the secure communication to verify the identity of the cryptographic expansion device (310). In such embodiments, the cryptographic expansion device (310) may optionally send a select file command (1304) to the SIM card (300) to access the designated file storing the information in the SIM card (300). In response to receiving the select file command (1304), the SIM card (300) sends a response (1306) to the cryptographic expansion device (310) indicating the designated file has been selected and is ready to be read. The cryptographic expansion device (310) then sends a read command (1308) to the SIM card (300) to read the information from the designated file. In response to the read command (1308), the SIM card (300) sends file content (1310), for example, the ICCID and/or IMSI of the SIM card (300), to the cryptographic expansion device (310).

Next, the cryptographic expansion device (310) sends a response (1312) to the mobile device (320) to acknowledge that the menu selection command (1302) was received. The mobile device (320) then sends a fetch command (1314) to the cryptographic expansion device (310) to obtain any pending commands that the cryptographic expansion device (310) wants the mobile device (320) to perform to carry out the secure operation. In some embodiments, depending on the secure operation selected by the user, in response to receiving the fetch command (1314), the cryptographic expansion device (310) may optionally send a display command (not shown) to the mobile device (320) to instruct the mobile device (320) to prompt a user for input on the display screen of mobile device, for example, to prompt the user to enter a PIN, account information, payment recipient information, or other information related to the secure operation being performed. When the user enters the requested information on the user interface of the mobile device (320), the mobile device (320) sends a user-input-event command (not shown) to the cryptographic expansion device (310) to notify the cryptographic expansion device (310) that user input has been received. The cryptographic expansion device (310) can then send a get-user-input command (1316) to the mobile device (320) to request the user input. In response, the mobile device (320) sends user input (1318) to the cryptographic expansion device (310). The cryptographic expansion device (310) may perform cryptographic operations on the user input such as encrypting the user input using any of the encryption algorithms stored in the cryptographic expansion device (310), or generate a message authentication code (MAC) or hash of the user input. The cryptographic expansion device (310) sends a response (1320) to the mobile device (320) acknowledging the user input has been received.

The mobile device (320) may send another fetch command (not shown) to the cryptographic expansion device (310) to obtain further device commands that the cryptographic expansion device (310) wants the mobile device (320) to execute to carry out the secure operation. Thus, the mobile device (320) and the cryptographic expansion device (310) can optionally exchange a series of fetch commands and device commands in response to those fetch commands to instruct the mobile device (320) to perform various functions to carry out the secure operation selected by the user. Furthermore, depending on the secure operation selected by the user, the information that the cryptographic expansion device (310) may request or use to carry out the secure operation is not just limited to user input. For example, the cryptographic expansion device (310) may send commands to the mobile device (320) to instruct the mobile device (320) to retrieve information using any of the interfaces of the mobile device (320). The cryptographic expansion device (310) may instruct the mobile device (320) to obtain location information from a global positioning system interface of the mobile device (320). The cryptographic expansion device (310) may request information received from an external near field communication (NFC) device or near sound communication (NSC) device through a NFC or NSC interface of the mobile device (320). The cryptographic expansion device (310) may instruct the mobile device (320) to retrieve information from the internet through a wireless data interface of the mobile device (320), and so on. The cryptographic expansion device (310) may perform additional cryptographic operations on any information obtained from the various interfaces of the mobile device (320).

Once the cryptographic expansion device (310) has obtained and performed the desired cryptographic operations on the information (e.g., account numbers, transaction amount, etc.) that the cryptographic expansion device (310) will use to carry out the secure operation, in response to a fetch command (1322) received from the mobile device (320), the cryptographic expansion device (310) can transmit a send communication command (1324) with an encrypted message that includes any of the information described above to the mobile device (320). The send communication command (1324) can instruct the mobile device (320) to transmit an encrypted message provided by the cryptographic expansion device (310) using any of the communication interfaces available on the mobile device (320). For example, the send communication command (1324) may instruct the mobile device (320) to send a secure SMS message with encrypted data provided by the cryptographic expansion device (310) to a server to make a mobile payment or to check account balance. The send communication command (1324) may instruct the mobile device (320) to send a secure unstructured supplementary service data (USSD) message with encrypted data to start a USSD two-way communication session with a banking server. The send communication command (1324) may also instruct the mobile device (320) to send a secure NFC, NSC or radio frequency (RF) communication with encrypted data via the NFC, NSC or RF interface of the mobile device (320) to a NFC, NSC or RF enabled recipient device such as a point-of-sale (POS) terminal. Because the information that the mobile device (320) transmits out in the secure communication is provided to the mobile device (320) in an encrypted format by the cryptographic expansion device (310), the secure communication is already encrypted when it leaves the communication interface of the mobile device (320). In this manner, secure encrypted end-to-end communication can be maintained between the mobile device (320) and a recipient device.

Figure 10:
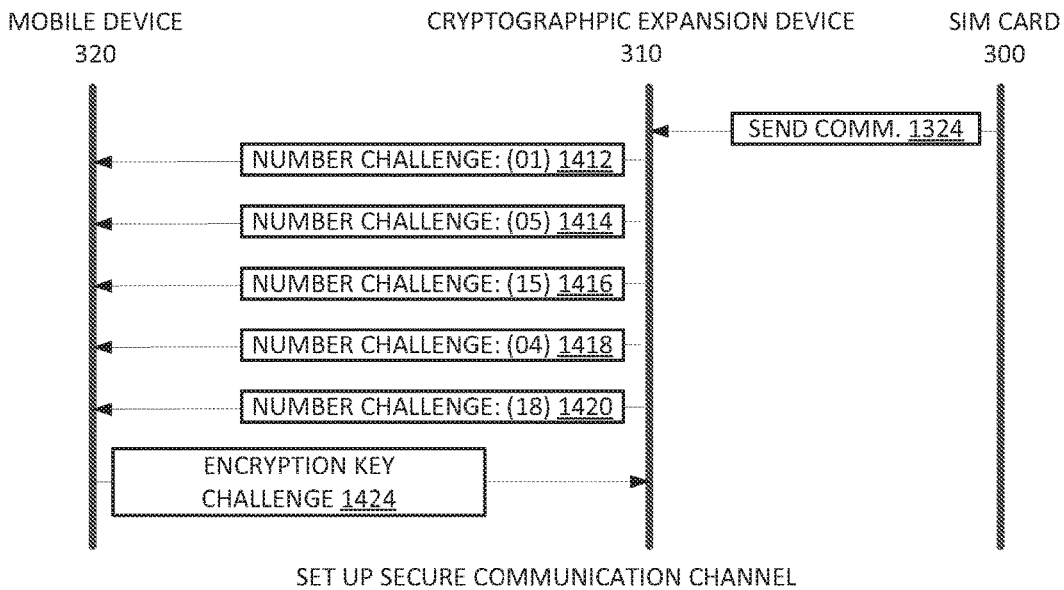
FIG. 10 illustrates a diagram showing the process of setting up a secure communication channel between devices using a cryptographic expansion device, according to one embodiment of the invention.

Referring now to FIG. 10, in some embodiments, where the cryptographic expansion device (310) is locked and is coupled the mobile device (320) and/or SIM card (300) to which it is locked, the send communication command (1324) may instruct the mobile device (320) to send a series of messages to a recipient device (730) to set up a secure communication channel or tunnel. The series of messages (1412-1420) can be used to verify the identity of recipient device (730) and to verify the identity of the mobile device (320) to recipient device (730). This way of verifying the identities of the communicating devices can be especially useful with NFC and/or RF communications where the identity of the recipient device (730) may not be known to the mobile device (320) prior to the communication. The series of messages (1412-1420) can be a number challenge that includes a specific sequence of numbers that is only known to the mobile device (320) as provided by the cryptographic expansion device (310), and only known to authorized recipient devices that are allowed to communicate with the mobile device (320).

When the recipient device (730) receives a first message (1412), the recipient device (730) does not initially respond. The recipient device (730) will not respond until all messages (1412-1420) has been received and the number sequence transmitted in the messages (1412-1420) is confirmed to be a valid and correct sequence. Thus, the recipient device (730) can verify the identity of the mobile device (320) based on the number challenge received in the series of messages (1412-1420). The mobile device (320) can also use the number challenge to verify the identity of recipient device (730). For example, if a recipient device response to the first message (1412), the mobile device (320) can determine that the recipient device is not an authorized recipient device because an authorized recipient device would not respond right away to the first message (1412). It should be appreciated that the series of messages as described is not limited to five messages as shown, and can include any number of messages, and that the number challenge can be any sequence of numbers, sequence of alphanumeric characters, or sequence of other types of messages. Furthermore, in other embodiments, the mobile device (320) equipped with the cryptographic expansion device (310) can act as a recipient device and be on the receiving end of a number challenge.

In some embodiments, to provide an additional level of security to verify the identity of the devices, the recipient device (730) can respond to the reception of a valid and correct number challenge with an encryption key challenge (1424). The encryption key challenge (1424) can be a symmetric key challenge or an asymmetric key challenge. In the encryption key challenge (1424), the recipient device (730) can send a random number to the mobile device (320) to request the mobile device (320) to encrypt the random number with an encryption key that would only be known to an authorized device. The mobile device (320) can send the random number to the cryptographic expansion device (310) and request the cryptographic expansion device (310) to encrypt the random number using the requested encryption key stored in the cryptographic expansion device (310). The cryptographic expansion device (310) can respond to the mobile device (320) with the encrypted random number, and the mobile device (320) then sends the encrypted random number to the recipient device (730). The recipient device (730) then decrypts the encrypted random number with a corresponding key, which can be a symmetric key or an asymmetric key. If the decryption results in the random number that the recipient device (730) has previously sent to the mobile device (320), then the recipient device (730) can be further assured that the mobile device (320) equipped with the cryptographic expansion device (310) is an authorized device, and a secure communication channel or tunnel can be established between the mobile device (320) and the recipient device (730). Exchange of sensitive information with secure communications between the two devices can then proceed.

One advantage of the being able to verify the identities of the communicating devices using the cryptographic expansion device (310) as described above is that the number sequence of the number challenge and the encryption key used in the encryption key challenge can be provisioned to be unique for each cryptographic expansion device, and thus can be provisioned to be user specific. If the number sequence and/or the encryption key used in the encryption key challenge is somehow compromised, the infiltration will be isolated to a single user, and the remaining user base of the mobile network will not be compromised. The affected user's keys can be changed without impacting the configuration of the remaining user base.

Figure 11:
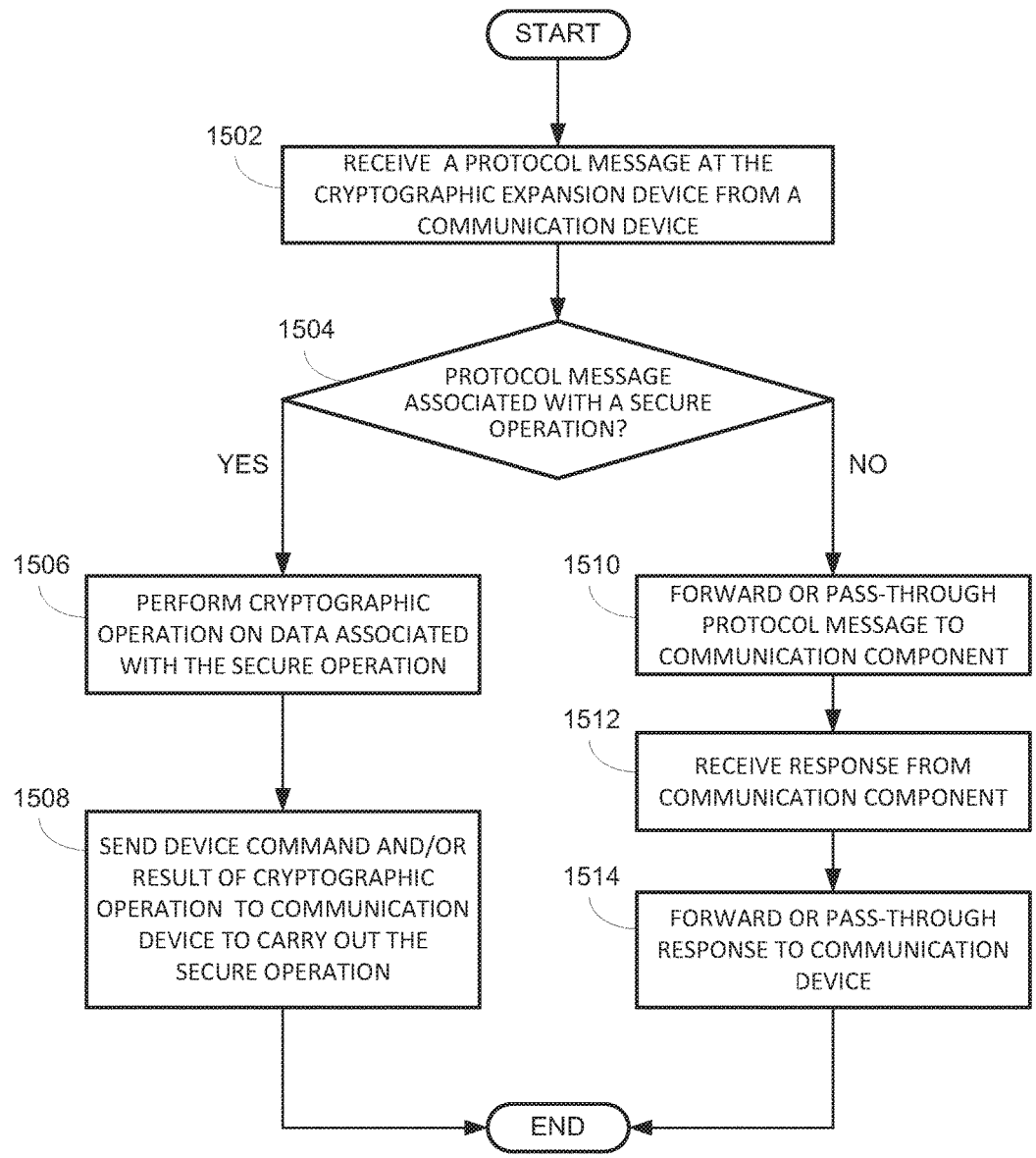
FIG. 11 illustrates a flow diagram of performing a secure operation with a cryptographic expansion device, according to one embodiment of the invention.

FIG. 11 illustrates a flow diagram for enabling transmission of secure communications from a communication device (e.g., the mobile device (320) of FIG. 5) using a cryptographic expansion device (e.g., the cryptographic expansion device (310) of FIG. 5) attached to a communication component (e.g., the SIM card (300) of FIG. 5) of the communication device, according to various embodiments, where the cryptographic expansion device is locked and is coupled the communication device and/or communication component to which it is locked.

At a first stage (1502), the cryptographic expansion device receives a protocol message from the communication device according to a communication protocol that the communication device uses to communicate with the communication component. The protocol message can be a command or information that is associated with a secure operation to be performed by the cryptographic expansion device. For example, the protocol message can be a command associated with a request from a user to perform a financial or banking transaction using a secure application stored in the cryptographic expansion device such as a mobile banking application or a contactless payment application. The financial or banking transaction can be a mobile payment, a mobile money transfer, an account balance inquiry, or other financial or banking transactions or account inquiries, and may involve sending or receiving a secure communication. The protocol message can also be a command or information associated with a non-secure operation that is intended for the communication component of the communication device. In some embodiments, the protocol message can include a flag or a protocol identification (ID) field to indicate whether the protocol message is intended for the communication component.

At a next stage (1504), the cryptographic expansion device determines if the protocol message is associated with a secure operation. If the cryptographic expansion device determines that the protocol message involves a secure operation to be performed by the cryptographic expansion device, for example, by examining the flag or the protocol ID of the protocol message, then at a next stage (1506), using the embedded cryptographic processor, the cryptographic expansion device processes the protocol message and performs a cryptographic operation on data or information associated with the secure operation as indicated by the protocol message. The data or information can be data or information that is stored in the cryptographic expansion device and/or in the communication component, or data or information such as user input or other information that is obtained from an interface of the communication device. For example, to carry out a secure operation such as sending a secure communication to perform a financial or banking transaction, the cryptographic expansion device may retrieve an encrypted PIN from the cryptographic expansion device, obtain subscriber information from the communication component, and/or obtain user input from the communication device such as a primary account number (PAN) or a portion of a PAN entered by a user on the user interface of the communication device. The data or information associated with the secure operation can also be embedded in the protocol message received from the communication device. For example, the protocol message received from the communication device can include an encrypted communication for the cryptographic expansion device to decrypt.

To perform the cryptographic operation on data or information associated with the secure operation, the cryptographic expansion device may select a suitable encryption and/or MAC or hash algorithm stored in the cryptographic expansion device. The cryptographic expansion device then retrieves a cryptographic or encryption key associated with the selected encryption, and performs a cryptographic operation such as encrypting or decrypting the data or information associated with the secure operation using the encryption key and selected algorithm. The cryptographic expansion device may also generate or verify a MAC or hash on data or information associated with the secure operation.

Then at a next stage (1508), the cryptographic expansion device sends a device command and/or the result of the cryptographic operation (i.e. processed data such as encrypted or decrypted data) to the communication device in accordance with the protocol of the protocol message. The processed data or device command can be sent from the cryptographic expansion device to the communication device, for example, via the first set of electrical contacts of the cryptographic expansion device. The device command can include commands instructing the communication device to perform certain operations to carry out the secure operation such as sending encrypted data provided by the cryptographic expansion device in a secure communication on a communication interface of the communication device. In some embodiments, the communication interface can be a cellular interface for sending SMS or USSD messages, or a NFC or RF interface for sending NFC or RF communications. In other embodiments, the communication interface can be any of the communication interfaces provided in the communication device. As another example, the device command can instruct the communication device to display plaintext data or information to a user that the cryptographic expansion device decrypted from an encrypted message sent to the communication device. It should be understood that depending on the secure operation that is being requested or associated with the protocol message received from the communication device at the initial stage (1502), the cryptographic expansion device may send more than one device command to the communication device to carry out the secure operation, and that in some embodiments, there can be multiple iterations of protocol message and device command exchanges to carry out a secure operation.

Referring back to the second stage (1504), if the cryptographic expansion device determines that the protocol message is associated with a non-secure operation that is intended for the communication component, then at a next stage (1510), the cryptographic expansion device forwards or passes through the protocol message to the communication component. At a further stage (1512), the communication component may reply to the cryptographic expansion device with a response to the protocol message. Upon receiving the response to the protocol message from the communication component, at a next stage (1514), the cryptographic expansion device forwards or passes through the response to the communication device.

It should be appreciated that while the methods and apparatuses for sending and receiving secure communications discussed above have been described with reference to performing financial and/or banking transactions from a mobile device, the methods and apparatuses discussed above can also be used to perform secure communications from a mobile device for other applications as well, such as personal or corporate secure communication (e.g., for sensitive or confidential communications to avoid industrial espionage), health care communication (e.g., for confidential medical information or electronic prescription delivery), or governmental agency communication (e.g., for law enforcement). If, at any stage in the exemplary operations described above, the cryptographic expansion device is removed from the SIM card and/or mobile device to which it is locked, the cryptographic expansion device will be rendered unusable, either permanently or temporarily until the cryptographic expansion device is again coupled to the mobile device and/or SIM card to which it is locked.

Figure 12:
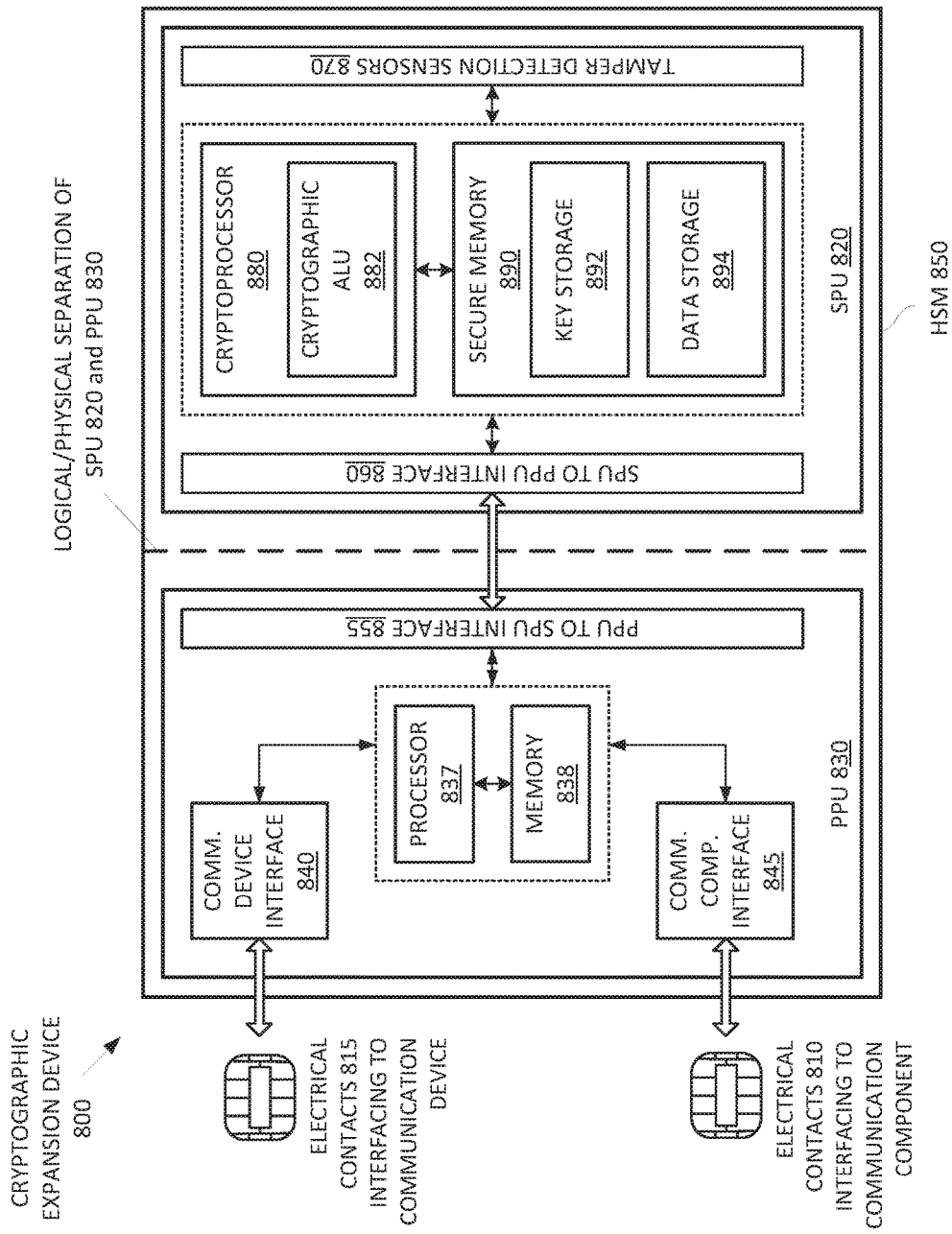
FIG. 12 illustrates a block diagram of the components of a cryptographic expansion device, according to one embodiment of the invention.

FIG. 12 shows a block diagram illustrating the hardware components of a cryptographic expansion device (800) according to embodiments of the invention.

Although FIG. 12 is described with reference to an HSM disposed in a cryptographic expansion device, features, modules, components and the like described with reference to FIG. 12 may be provided correspondingly in embodiments of the invention described above with reference to FIGS. 1 to 3B in which the secure element may be disposed in a mobile device or a UICC.

The cryptographic expansion device (800) includes an HSM (850) having a public processing unit (PPU) (830) and a secure processing unit (SPU) (820) coupled to the PPU (830). It should be noted that although the SPU (320) is coupled to the PPU (330), the cryptographic expansion device (800) provides a logical and/or physical separation between the SPU (820) and the PPU (830). A "physical separation" refers to some physical boundary between the SPU (820) and the PPU (830). For example, the SPU (820) and the PPU (830) can be implemented with and manufactured as separate semiconductor dies or separately packaged semiconductor chips, and the physical boundary of the dies or chips can serve as the physical separation. A "logical separation" refers to the separation of the communication interface and storage memory between the SPU (820) and the PPU (830). As shown in FIG. 12, the SPU (820) has its own communication interfaces (840, 845, 850) which are separate from a communication interface (860) of the SPU (820). The PPU (830) also has its own memory (838), which is separate from a secure memory (890) of the SPU (820). As will be explained below, the logical and/or physical separation provided between the SPU (820) and the PPU (830) creates a division in hardware roles to protect the SPU (820) and the contents stored in the secure memory (890) from unauthorized accesses.

According to some embodiments, the PPU (830) includes a processor (837), a memory (838), a communication device interface (840), a communication component interface (845), and a PPU-to-SPU interface (855). The processor (837) can be implemented as one or more processors or controllers. The memory (838) is coupled to the processor (837), and provides storage to store data and executable code that when executed by the processor (837), causes the processor (837) to run an operating system (OS) and/or applications that can be complaint with Payment Card Industry (PCI) and International Organization for Standardization (ISO) standards to manage the functionality and operations of the cryptographic expansion device (800), and to process the exchange of information between the various interfaces of the PPU (830).

The communication device interface (840) is coupled to electrical contacts (815) that interface with a communication device such as a mobile device (e.g., a mobile phone), and provides a set of signals that can include a clock signal and one or more data input/output (I/O) signals to send and receive commands and information between the PPU (830) and the communication device. The communication component interface (845) is coupled to electrical contacts (810) that interfaces to a communication component such as a communication card (e.g., a SIM card), and provides a set of signals that can include a clock signal and one or more data input/output (I/O) signals to send and receive commands and information between the PPU (830) and the communication component. The PPU-to-SPU interface (850) is coupled to the SPU (820), and provides a set of signals that can include a clock signal and one or more data input/output (I/O) signals to send commands and information such as encryption and decryption requests to the SPU (820), and to receive commands and information such as encryption and decryption results from the SPU (820). Because of the logical and physical separation between the SPU (820) and the PPU (820), the SPU (820) is exposed to the PPU (830) only, and is not accessible to the communication device or to the communication component, except through the PPU (830). Hence, the PPU (830) can serve as a firewall or a gatekeeper to ensure unauthorized or unwanted communications such as hacking attempts are not sent to the SPU (820).

According to some embodiments, the SPU (820) includes a cryptoprocessor (880), a secure memory (890), and an SPU-to-PPU interface (860). The SPU (820) can also include tamper detection sensors (870). As mentioned above, the SPU (820) is accessible from the PPU (830) only, and receives commands and information from the PPU (830) through the SPU-to-PPU interface (860). The SPU-to-PPU interface (860) provides a set of signals that can include a clock signal and one or more data input/output (I/O) signals coupled to the PPU-to-SPU interface (855) that the SPU (820) can use to communicate with the PPU (830). In some embodiments, the SPU (820) will only respond to encryption and decryption requests to perform cryptographic operations from the PPU (830) received through the SPU-to-PPU interface (860).

The cryptoprocessor (880) can be implemented as one or more cryptographic processors. A cryptographic processor is different from a general purpose processor in that a cryptographic processor includes dedicated circuitry and hardware such as one or more cryptographic arithmetic logic units (ALUs) (882) that are optimized to perform computational intensive cryptographic functions. The cryptographic ALUs (882) can include optimized pipelines and widen data buses to enable the cryptoprocessor (880) to perform cryptographic operations faster and more efficiently than general purpose processors.

The secure memory (890) is coupled to the cryptoprocessor (880), and can be partitioned into a cryptographic key storage (892) and a data storage (894). At least a portion or either the cryptographic key storage (892) or the data storage (894) may be configured to be write once read many (WORM) memory according to embodiments of the invention. The data storage (894) can be read and written by the cryptoprocessor (880), and provides storage memory to store user data such as data that are received on the SPU-to-PPU interface (860) from the PPU (830), and encryption and decryption results that are sent to the PPU (830) through the SPU-to-PPU interface (860). The key storage (892) can be read-only to the cryptoprocessor (880), and is used to store cryptographic keys and encryption algorithms. The cryptographic keys and algorithms stored in the key storage (892) are provisioned by the manufacturer during manufacturing of the cryptographic expansion device (800), and cannot be altered by an external source without a master key that is only known to the manufacturer and/or authorized parties who are authorized to provision the cryptographic expansion device (800) such as a mobile network operator or a wireless service provider. In some embodiments, the content of the key storage (892) is never transmitted outside of the SPU (820), and is inaccessible by the PPU (830). The cryptographic keys and algorithms stored in the key storage (892) can be provisioned to perform various encryption standards and protocols including but not limited to Data Encryption Standard (DES), Triple Data Encryption Standard/Algorithm (TDES/TDEA), DES-X, Secure Socket Layer (SSL), Advanced Encryption Standard (AES), Blowfish, Serpent, Twofish, Threefish, International Data Encryption Algorithm (IDEA), Rivest, Shamir, & Adleman (RSA), Digital Signature Algorithm (DSA), Tiny Encryption Algorithm (TEA), extended TEA (XTEA), and/or other encryption algorithms or protocols.

In some embodiments, the tamper detection sensors (870) are included to detect external attempts to tamper with the cryptographic expansion device (800). For example, the tamper detection sensors (870) may include temperature sensors to detect temperatures that may be indicative of someone attempting to desolder components of the cryptographic expansion device (800), and/or mechanical sensors to sense structural changes to the cryptographic expansion device (800) that may be indicative of someone attempting to dissect or cut open the cryptographic expansion device (800). The tamper detection sensors (870) may also include electrical sensors to sense certain voltage, current, or impedance changes to the circuitry of the cryptographic expansion device (800) that may be indicative of someone attempting to probe the components of the cryptographic expansion device (800), and/or electromagnetic sensors to sense certain radiation such as X-rays that may be indicative of someone attempting to examine the cryptographic expansion device (800). In some embodiments, the tamper detection sensors (870) may include circuitry that can erase and wipe out the contents of the secure memory (890) to render the SPU (820) and/or the cryptographic expansion device (800) unusable in response to detecting an attempt to tamper with the cryptographic expansion device (800). The cryptographic expansion device (800) can also be configured with organic or soluble interconnects that can be dissolved by a solvent released by the tamper detection sensors (870) in response to detecting an attempt to tamper with the cryptographic expansion device (800).

Figure 13:
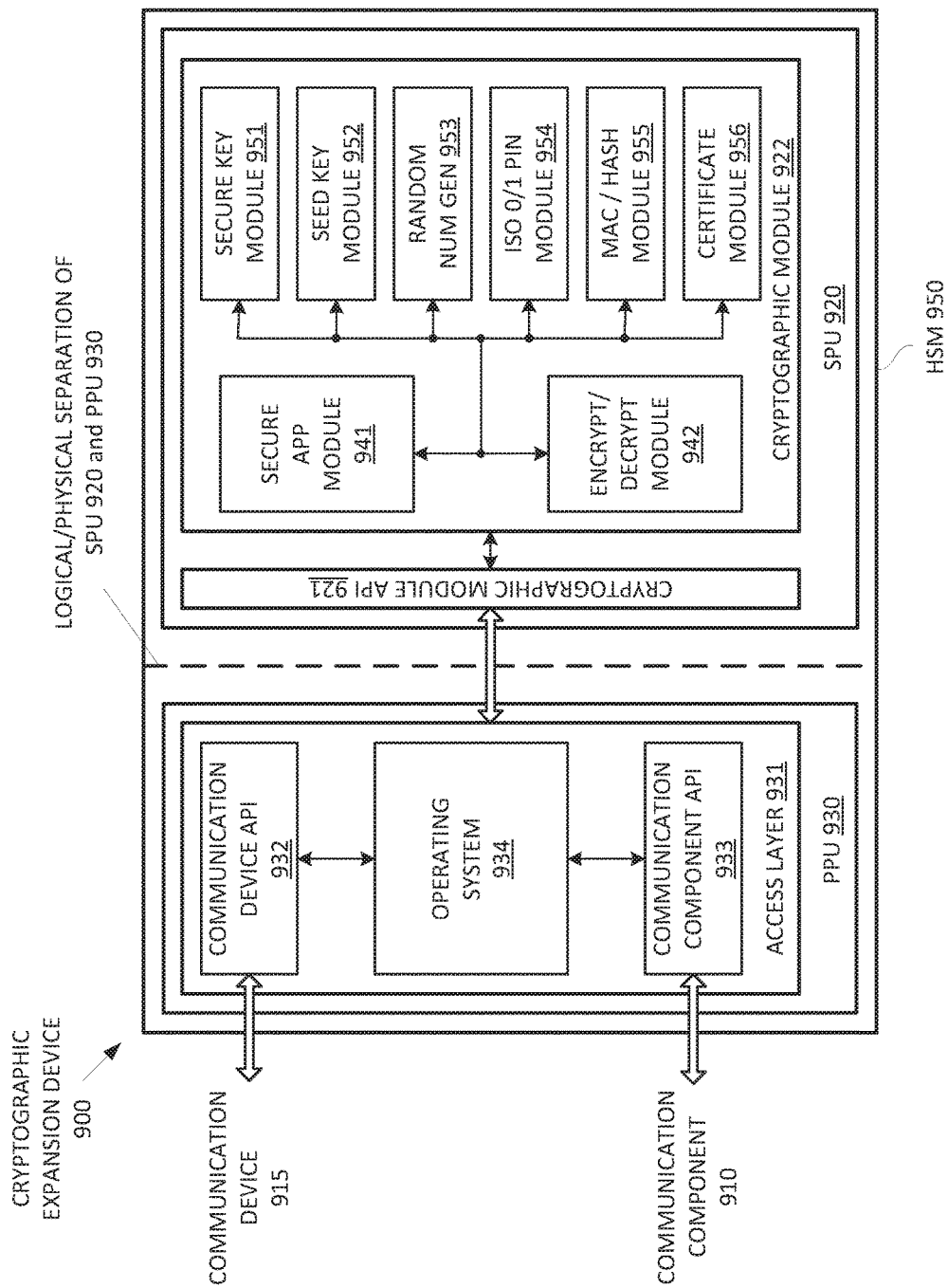
FIG. 13 illustrates a conceptual block diagram of the functional blocks of a cryptographic expansion device, according to one embodiment of the invention.

FIG. 13 shows a conceptual block diagram illustrating the functional features of a cryptographic expansion device (900), according to one embodiment.

Although FIG. 13 is described with reference to an HSM disposed in a cryptographic expansion device, features, modules, components and the like described with reference to FIG. 13 may be provided correspondingly in embodiments of the invention described above with reference to FIGS. 1 to 3B in which the secure element may be disposed in a mobile device or a UICC.

The cryptographic expansion device (900) can be implemented with, for example, the hardware components described with reference to the cryptographic expansion device (800) of FIG. 12. The PPU (930) of the cryptographic expansion device (900) includes an operating system (OS) (934), a communication device application programming interface (API) (932), and a communication component API (933). The OS (934), the communication device API (932), and the communication component API (933) together form an access layer (931), which represents the publicly accessible portion of the cryptographic expansion device (900). By "publicly accessible," it is meant that any device or components of a communication device (915) (e.g., a mobile phone) that can communicate directly with a communication component (910) (e.g., a SIM card), or with a communication component reader of the communication device (915) (e.g., a SIM card reader of a mobile device), would be able to send and receive commands and information to and from the access layer (931).

The communication device API (932) provides a programming interface to translate commands and information received from the communication device (915) into instructions and data that the OS (934) can process and execute, and vice versa. For example, the communication device API (932) may translate commands from the communication device (915) according to a mobile phone's SIM toolkit protocol into instructions and data that the OS (934) can process and execute to respond to the commands, and vice versa. The communication component API (933) provides a programming interface to translate commands and information received from the communication component (910) into instructions and data that the OS (934) can process and execute, and vice versa. For example, the communication component API (933) may translate commands from the communication component (910) according to a SIM card's SIM toolkit protocol into instructions and data that the OS (934) can process and execute to respond to the commands, and vice versa.

The OS (934) manages the functionality and operations of the cryptographic expansion device (900), and responds to commands and information from the communication device (915) (e.g., a mobile device such as a mobile phone) and/or the communication component (910) (e.g., a SIM card). The functionality and operations of the cryptographic expansion device (900) that the OS (934) can manage includes responding to user input received on the communication device (915) that relates to cryptographic operations, masking PIN entries on a user interface of the communication device (915), creating ISO PIN blocks in the SPU (920), sending encryption and decryption requests to the SPU (920) for secure communications sent to and from a communication interface of the communication device (915), sending requests to the SPU (920) to create or verify MAC or hash values for messages or portions of messages sent to and from a communication interface of the communication device (915), providing certificates for HTTPS applications, storing encrypted communications history, providing basic encryption to external applications, and managing commands and information exchange through the various interfaces such as passing through commands and information between the communication device (915) and the communication component (910).

For example, in response to encryption and decryption commands received from the communication device (915) on the communication device API (932), the OS (934) can send encryption and decryption requests and associated data to the SPU (920). The OS (934) may access and process information stored in the communication component (910) in response to a command to perform as such received from the communication device (915) on the communication device API (932). The OS (934) can also access information stored in the communication component (910) and forward the information to the SPU (920) in response to encryption and decryption commands involving such information. The OS (934) can forward encryption and decryption results from the SPU (920) to the communication device (915) and/or the communication component (910). The OS (934) can also issue commands to the communication device (915) and/or the communication component (910), for example, commands to request the communication device (915) to send a secure communication with data encrypted by the SPU (920).

For non-secure commands and information (i.e. commands and information that do not involve cryptographic operations), the OS (934) can pass through or forward the non-secure commands and information between communication device (915) and the communication component (910). For example, in response to non-secure commands and information from the communication device (915) intended for the communication component (910) received on the communication device API (932), the OS (934) can pass through or forward the non-secure commands and information to the communication component (910) through the communication component API (933). In response to non-secure commands and information from the communication component (910) intended for the communication device (915) received on the communication component API (933), the OS (934) can pass through or forward the non-secure commands and information to the communication device (915) through the communication device API (932).

The SPU (920) of the cryptographic expansion device (900) includes a cryptographic module API (921) and a cryptographic module (922). The cryptographic module API (931) provides a programming interface to translate commands and information received from the OS (934) into instructions and data that the cryptographic module (922) can process and execute, and vice versa. For example, the OS (934) may send an encryption/decryption request to the SPU (920), and the cryptographic module API (931) may translate the encryption/decryption request into an encryption/decryption instruction for the cryptographic module (922) to execute. In some embodiments, the cryptographic module API (931) may also include, in the translated encryption/decryption instruction, which particular encryption algorithm the cryptographic module (922) should use based on the particular application that is requesting the cryptographic operation.

According to various embodiments, the cryptographic module (922) includes a secure application module (941), an encryption/decryption module (942), a secure key module (951), a seed key module (952), a random number generator (953), an ISO 0/1 PIN module (954), a MAC/HASH module (955), and a certificate module (956). In other embodiments, the cryptographic module (922) may include additional modules to perform other cryptographic operations. The secure application module (941) can store one or more secure applications such as mobile banking applications or contactless payment applications. The secure application module (941) can process user input selecting a particular function of the secure applications stored therein, and can respond with one or more commands instructing the communication device (915) to perform certain operations, for example, to send an encrypted communication or send a sequence of messages to initiate communication with another device to carry out the user selected function. The secure application module (941) can also instruct the encryption/decryption module (942) to perform specific cryptographic operations depending on the user selected function.

The encryption/decryption module (942) can store and execute various encryption algorithms including, but not limited to, one or more of the encryption algorithms listed above. The secure key module (951) stores the set of cryptographic or encryption keys that are used in the various encryption algorithms performed by the encryption/decryption module (942). The encryption keys can include symmetric keys and/or asymmetric keys. The seed key module (952) stores a set of seed keys that are used to initialize the encryption/decryption module (942) in certain encryption algorithms, such as AES. The seed key module (952) also stores seed keys that are used by the random number generator (953) to generate random numbers used in certain encryption algorithms such as RSA and DSA. The encryption keys stored in the secure key module (951) and/or the seed keys stored in the seed key module (952) are provisioned during manufacturing, and cannot be altered by an external source without a master key that was used during manufacturing to program the cryptographic module (922). The encryption keys and seed keys can also be provisioned to be specific to a particular cryptographic expansion device, and hence the encryption keys and seed keys can be user-specific and unique to the user of the cryptographic expansion device (900). One advantage of providing user-specific keys is that if the cryptographic keys stored in the cryptographic module (922) are somehow compromised, the infiltration will be isolated to a single user, and the remaining user base of the mobile network will not be compromised. The affected user's keys can be changed without impacting the configuration of the remaining user base.

In some embodiments, the cryptographic module (922) includes an ISO PIN module (954) to mask a user's PIN entry into the communication device (915) and to generate PIN blocks (e.g., ISO format 0/1 PINs) in accordance with ISO 9564 standard. The PIN blocks generated by the ISO PIN module (954) stores PINs in an encrypted format that are used to verify a user's identity in banking transactions. The encrypted PINs stored in the PIN blocks of the ISO PIN module (954) can be passed from the SPU (920) to the PPU (930) to be included in secure communications sent from the communication device (915). It should be noted that the PINs stored in the ISO PIN module (954) are never stored in plaintext form, but are instead stored in an encryption format.

The cryptographic module (922) also includes a Message Authentication Code (MAC)/Hash module (955) to generate and verify MACs and/or hashes for secure communications sent to and from the communication device (915). A MAC or a hash can be generated for a message or a portion of the message such that the recipient can verify the message's data integrity and authenticity. The cryptographic module (922) can also include a certificate module to provide certificates such as Transport Layer Security (TLS) and Secure Sockets Layer (SSL) certificates used to verify a user's identity in Hypertext Transfer Protocol Secure (HTTPS) applications such as web applications accessed on a web browser of the communication device (915).

It should be understood that while the description and explanation provided below are made with reference to the particular embodiments, the description and explanation provided below are applicable to and can be adapted for other embodiments, for example, embodiments in which the cryptographic expansion device is used with other types of communication components such as a memory card. Furthermore, the description and explanation provided below are made with reference to commands according to SIM toolkit (STK) protocol to illustrate that the cryptographic expansion device (310) can interoperate with the mobile device (320) using the protocol that the mobile device (320) uses to communicate with the SIM card (300). In other embodiments in which the communication device communicates with a communication component using a different protocol, the description and explanation provided below can be adapted to use the commands in accordance with that protocol such that the cryptographic expansion device (310) can interoperate with the communication device seamlessly with requiring any modifications to the software of the communication device.

Figure 14:
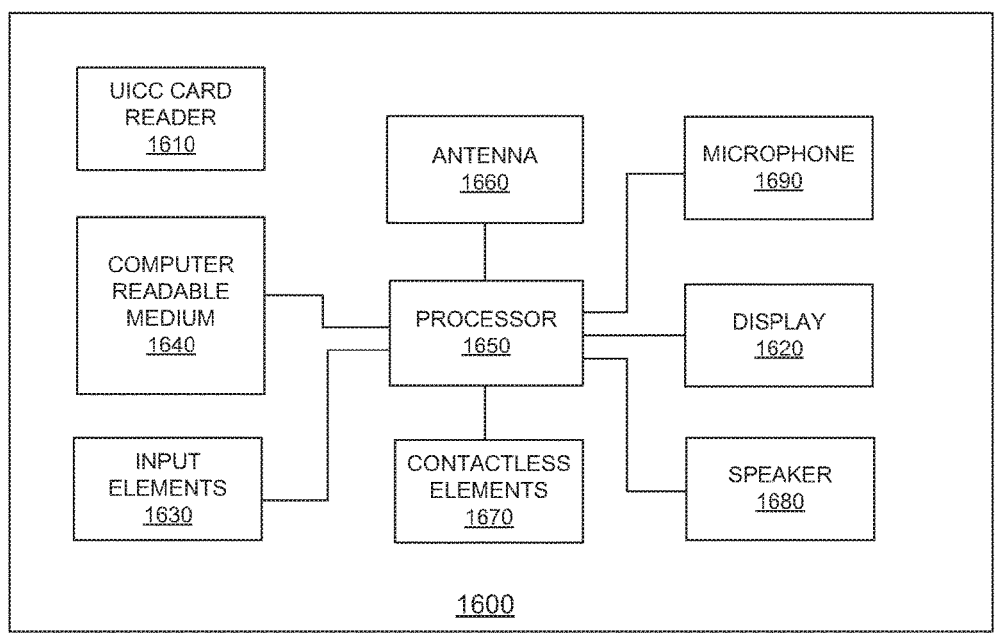
FIG. 14 illustrates a block diagram of an exemplary mobile device in which various embodiments of the invention can be implemented.

FIG. 14 shows a mobile device (1600) according to the embodiments described above. The mobile device (1600) includes a UICC reader (1610) for accepting a UICC (which may be a SIM card) that may be equipped with a cryptographic expansion device as described herein. The mobile device (1600) also includes a display (1620), an input element (1630), computer readable medium (1640) such as volatile and non-volatile memory, a processor (1650) and at least one antenna (1660). In addition, the mobile device (1600) may include a dual interface including both a contact (not shown) and a contactless interface (1670) for transferring information through direct contact or through an integrated chip, which may be coupled to a second antenna. The mobile device (1600) may be capable of communicating through a cellular network, such as GSM through the antenna (1660). The mobile device (1600) also includes a speaker (1680) and a microphone (1690). Thus, the mobile device (1600) may be capable of transmitting and receiving information wirelessly through both short range NFC, RF and cellular connections, and through NSC. The device of FIG. 14 may include an account identifier associated with an account.

In certain implementations, individual blocks (or steps) described above with respect to the figures may be combined, eliminated, or reordered. Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of verification conducted at a secure element interacting with a mobile device, the method comprising:
receiving, by the secure element, a request from the mobile device for an interaction with the secure element;
receiving, by the secure element, at least one of an identifier of a universal integrated circuit card (UICC) and an identifier of the mobile device from the mobile device;
comparing, by the secure element, each of the received at least one of the identifier of the UICC and the identifier of the mobile device against a corresponding registered identifier for at least one of the UICC and the mobile device stored in a non-volatile memory of the secure element; and,
if each of the at least one of the identifier of the UICC and the identifier of the mobile device matches the corresponding registered identifier stored in the non-volatile memory based on the comparing, permitting, by the secure element, the requested interaction with the mobile device; or,
if each of the at least one of the identifier of the UICC and the identifier of the mobile device does not match the corresponding registered identifier stored in the non-volatile memory based on the comparing, denying, by the secure element, the requested interaction with the mobile device,
wherein the secure element is a hardware security module having a public processing unit with memory and a secure processing unit with secure memory providing the non-volatile memory, wherein the secure processing unit is logically and physically separated from the public processing unit, and wherein method includes steps of:
the public processing unit determining whether an incoming communication from the mobile device is authorized; and,
if the incoming communication is authorized, transmitting the communication from the mobile device to the secure processing unit.

2. The method as claimed in claim 1, wherein the secure processing unit is a tamper-resistant secure cryptoprocessor.

3. The method as claimed in claim 1, wherein the method includes initial registration steps of:
receiving at least one of the identifier of the UICC and the identifier of the mobile device; and,
registering the at least one of the identifier of the UICC and the identifier of the mobile device in the non-volatile memory of the secure element so as to initialize the secure element.

4. The method as claimed in claim 3, wherein the secure element is one of a group of: a secure element disposed in a cryptographic expansion device; a secure element disposed in the mobile device; and a secure element disposed in the UICC, and wherein the initial registration steps are conducted upon a user activating an authorized mobile software application resident in and installed on the mobile device or the secure element for a first time.

5. The method as claimed in claim 3, wherein the secure element is one of a group of: a secure element disposed in a cryptographic expansion device; and a secure element disposed in the UICC, and wherein the initial registration steps are conducted upon a user powering the mobile device after inserting the UICC or the cryptographic expansion device for a first time therein.

6. The method as claimed in claim 1, wherein the method includes a step of requesting, by the secure element, the at least one of the identifier of the UICC and the identifier of the mobile device from the mobile device.

7. A secure element for interacting with a mobile device, comprising:
an identifier receiving component for receiving at least one of an identifier of a universal integrated circuit card (UICC) and an identifier of the mobile device;
a non-volatile memory for storing a corresponding registered identifier for at least one of the UICC and the mobile device;
a comparing component for comparing each of the received at least one of the identifier of the UICC and the identifier of the mobile device against the corresponding registered identifier stored in the non-volatile memory; and,
a verifying component for receiving a request from the mobile device for an interaction with the secure element and for permitting the requested interaction with the mobile device only if each of the at least one of the identifier of the UICC and the identifier of the mobile device matches the corresponding registered identifier stored in the non-volatile memory,
wherein the secure element is a hardware security module having a public processing unit with memory and a secure processing unit with secure memory providing the non-volatile memory, wherein the secure processing unit is logically and physically separated from the public processing unit, and wherein the public processing unit is configured to serve as a gatekeeper to prevent unauthorized communications from being sent to the secure processing unit from the mobile communication device in response to the requested interaction.

8. The secure element as claimed in claim 7, wherein the secure processing unit is a tamper-resistant secure cryptoprocessor.

9. The secure element as claimed in claim 7, wherein the identifier of the mobile device is a permanent identifier uniquely associated with the mobile device and the identifier of the UICC is a permanent identifier uniquely associated with the UICC.

10. The secure element as claimed in claim 7, wherein the non-volatile memory of the secure element in which the registered identifiers for the at least one of the UICC and the mobile device are stored is a write once read many (WORM) data storage memory which can be written to only once.

11. The secure element as claimed in claim 7, further including a registration component for registering the at least one of the identifier of the UICC and the identifier of the mobile device in the non-volatile memory of the secure element so as to initialize the secure element.

12. A system for verification including a secure element and a mobile device, the secure element comprising:
an identifier receiving component for receiving at least one of an identifier of a universal integrated circuit card (UICC) and an identifier of the mobile device;
a non-volatile memory for storing a corresponding registered identifier for at least one of the UICC and the mobile device;
a comparing component for comparing each of the received at least one of the identifier of the UICC and the identifier of the mobile device against the corresponding registered identifier stored in the non-volatile memory; and,
a verifying component for receiving a request from the mobile device for an interaction with the secure element and for permitting the requested interaction with the mobile device only if each of the at least one of the identifier of the UICC and the identifier of the mobile device match matches the corresponding registered identifier stored in the non-volatile memory, wherein the secure element is a hardware security module having a public processing unit with memory and a secure processing unit with secure memory providing the non-volatile memory, wherein the secure processing unit is logically and physically separated from the public processing unit, and wherein the public processing unit is configured to serve as a gatekeeper to prevent unauthorized communications from being sent from the mobile device to the secure processing unit.

13. The system as claimed in claim 12, wherein the system includes a UICC, wherein the UICC is a subscriber identity module (SIM) card, and wherein the identifier of the UICC is at least one of an Integrated Circuit Card Identifier (ICCID) and an International Mobile Subscriber Identity (IMSI) number.

14. The system as claimed in claim 12, wherein the identifier of the mobile device is one or more of a group of: a unique device identifier; an International Mobile Station Equipment Identity (IMEI) number; and a media access control address.

15. The system as claimed in claim 13, wherein the secure element is disposed in the UICC, wherein the secure element is electrically coupled to and in communication with the mobile device via electrical contacts of the UICC and corresponding electrical contacts of a UICC reader of the mobile device.

16. The system as claimed in claim 13, wherein the secure element is disposed in a cryptographic expansion device including:
a first set of electrical contacts for interfacing to the mobile device;
a second set of electrical contacts for interfacing to the UICC; and,
a coupling element configured to attach the cryptographic expansion device to the UICC.

17. A method of verification conducted at a secure element interacting with a mobile device, the method comprising:
receiving, by the secure element, a request from the mobile device for an interaction with the secure element;
receiving, by the secure element, at least one of an identifier of a universal integrated circuit card (UICC) and an identifier of the mobile device from the mobile device;
comparing, by the secure element, each of the received at least one of the identifier of the UICC and the identifier of the mobile device against a corresponding registered identifier for at least one of the UICC and the mobile device stored in a non-volatile memory of the secure element; and,
if each of the at least one of the identifier of the UICC and the identifier of the mobile device matches the corresponding registered identifier stored in the non-volatile memory based on the comparing, permitting, by the secure element, the requested interaction with the mobile device; or,
if each of the at least one of the identifier of the UICC and the identifier of the mobile device does not match the corresponding registered identifier stored in the non-volatile memory based on the comparing, denying, by the secure element, the requested interaction with the mobile device,
wherein the method includes a step of intercepting a transmission between the mobile device and the UICC, the transmission including the at least one of the identifier of the UICC and the identifier of the mobile device.

* * * * *

UNITED STATES PATENT AND TRADEMARK OFFICE
CERTIFICATE OF CORRECTION

PATENT NO.        : 9,860,749 B2
APPLICATION NO.   : 14/894712
DATED             : January 2, 2018
INVENTOR(S)       : Horatio Nelson Huxham et al.

Page 1 of 1

It is certified that error appears in the above-identified patent and that said Letters Patent is hereby corrected as shown below:

In the Claims

In Column 33 Line 4 removes "match matches the" and insert -- matches the --

Signed and Sealed this
Eighth Day of May, 2018

Andrei Iancu
*Director of the United States Patent and Trademark Office*